(12) United States Patent
Gagne et al.

(10) Patent No.: US 8,695,283 B2
(45) Date of Patent: Apr. 15, 2014

(54) VAPOR BARRIER CEILING SEAL APPARATUS

(76) Inventors: Jean-Guy Gagne, Etobicoke (CA); James W. Rogers, Toronto (CA)

( * ) Notice: Subject to any disclaimer, the term of this patent is extended or adjusted under 35 U.S.C. 154(b) by 168 days.

(21) Appl. No.: 13/208,017

(22) Filed: Aug. 11, 2011

(65) Prior Publication Data
US 2012/0279777 A1    Nov. 8, 2012

Related U.S. Application Data

(63) Continuation-in-part of application No. 13/185,144, filed on Jul. 18, 2011.

(60) Provisional application No. 61/483,254, filed on May 6, 2011.

(51) Int. Cl.
*E04B 9/00* (2006.01)

(52) U.S. Cl.
USPC ............ 52/39; 52/3; 52/63; 52/79.12; 52/408

(58) Field of Classification Search
USPC ............ 52/3, 27, 28, 39, 63, 79.12, 408, 411, 52/412, 576, 577; 174/40 R, 50, 53, 54, 58
See application file for complete search history.

(56) References Cited

U.S. PATENT DOCUMENTS

| | | |
|---|---|---|
| 4,345,693 A | 8/1982 | Balkwill et al. |
| 4,626,617 A | 12/1986 | Rye |
| 4,673,097 A | 6/1987 | Schuldt |
| 6,031,181 A | 2/2000 | Jacks |
| 6,239,365 B1 | 5/2001 | McEvers |
| 6,338,225 B1 * | 1/2002 | Hayes .................. 52/27 |
| 6,437,241 B1 | 8/2002 | Neujahr |
| 6,908,003 B2 * | 6/2005 | Feyes et al. .................... 220/3.2 |
| 2006/0102372 A1 | 5/2006 | Jacks |
| 2007/0111570 A1 | 5/2007 | Jacks |
| 2008/0010907 A1 * | 1/2008 | Moench ............................ 52/28 |
| 2008/0011501 A1 | 1/2008 | Gates et al. |

FOREIGN PATENT DOCUMENTS

CA    2129202 A1    1/1996

OTHER PUBLICATIONS

International Search Report corresponding to Application No. PCT/CA2012/000383, mailed on Jul. 17, 2012.

* cited by examiner

*Primary Examiner* — William Gilbert
*Assistant Examiner* — Patrick Maestri
(74) *Attorney, Agent, or Firm* — Ditthavong Mori & Steiner, P.C.

(57) ABSTRACT

An opening in a vapor barrier membrane interior to a ceiling can be sealed by a flexible enclosure. A planar member of the enclosure can be bonded to the inner side of the membrane. The enclosure is formed with a cavity that can encompass a ceiling mounted electrical device. A fastener is joined to the planar member permits bonding thereof with an interior surface of the membrane by manual application of a compressive force. The fastener may comprise a removable release liner covering an adhesive.

18 Claims, 35 Drawing Sheets

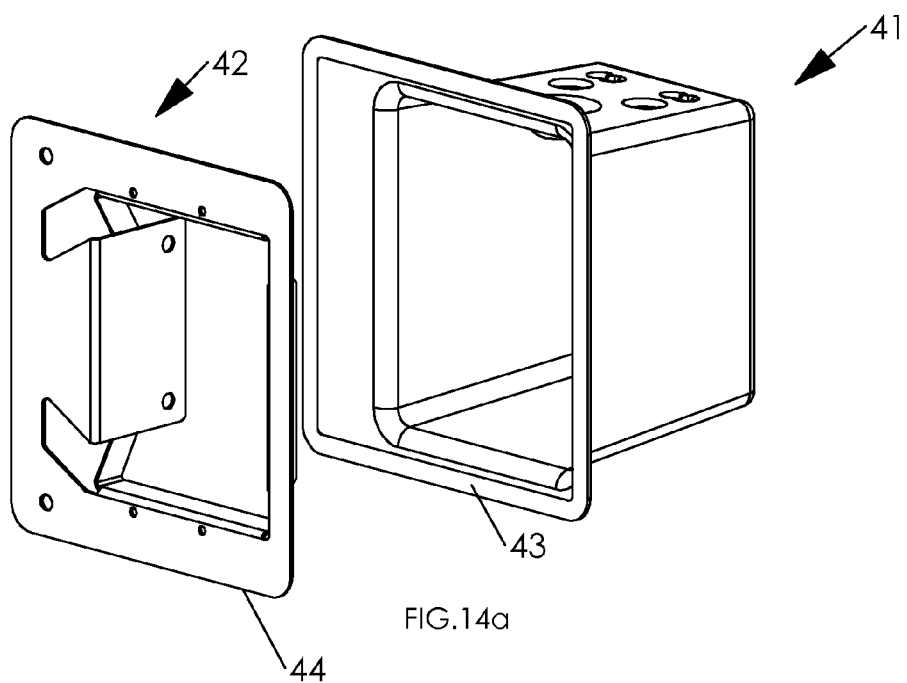
FIG.14a
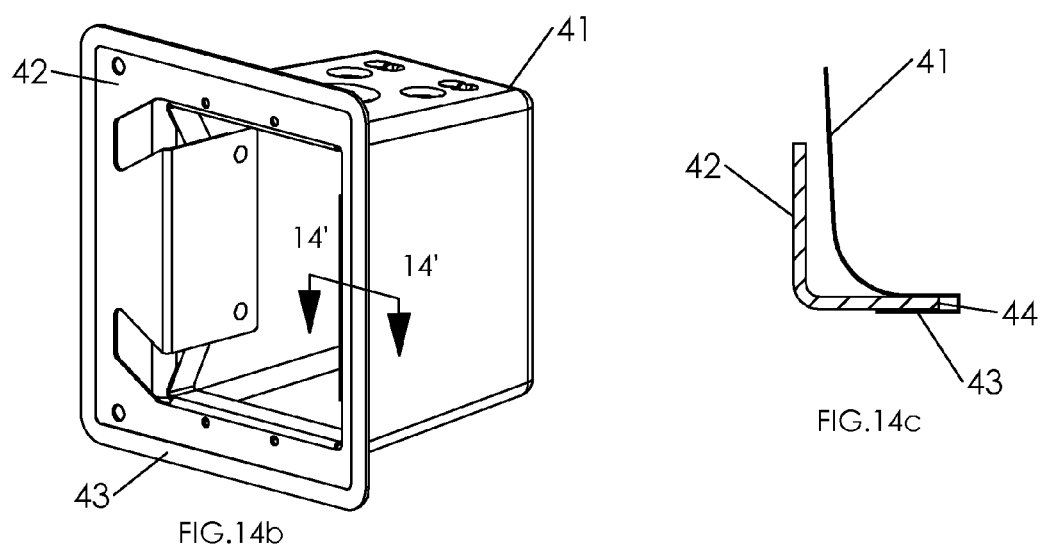
FIG.14b
FIG.14c

VAPOR BARRIER CEILING SEAL APPARATUS

This is a continuation-in-part of application Ser. No. 13/185,144, filed Jul. 18, 2011 on behalf of inventors Guy Gagne and James Rogers, claiming the benefit of provisional application 61/483,254 under 35 U.S.C. 119(e).

BACKGROUND

This disclosure is related to preservation of vapor barriers in building structures. More particularly, integrity of vapor barrier functionality is maintained when access to the interior of a wall or ceiling requires breaching a vapor barrier membrane.

Vapor barriers are required to prevent condensation that would otherwise occur from interaction between cold ambient air from outside the building and the warmer inside air. A vapor barrier seals against cold air flow within wall and ceiling spaces. In various situations, it would be desirable to gain access within an existing wall or ceiling that has been protected by a vapor barrier. For example, addition of accessories such as electrical boxes, data ports, light fixtures, speakers or the like would require forming an opening in the wall or ceiling and breaching the vapor barrier. As another example, it may become necessary to access a gas or plumbing valve that is interior to a wall or ceiling. The need to provide vapor seal protection applies to new building construction, i.e., prior to completion of walls and ceilings, as well as to protection when gaining access through a pre-existing wall or ceiling. Typically, attempts are made to prevent air leakage haphazardly by manually taping or patching spaces in barrier membranes. Such efforts become time intensive and ineffective as they are susceptible to breakage.

With respect to ceiling mounted devices, protection would also be desirable to avoid other harmful effects, for example, that may result from accumulation of dust or insulation in the device. An effective sound barrier for the ceiling mounted device would also be desirable.

A need thus exists for a device that can effectively and efficiently preserve vapor barrier functionality in buildings in which existing vapor barrier membranes are breached when access is provided to the interior of walls or ceilings. Minimization of installation time is a significant cost saving consideration. Such a device would also be desirable in new building sites to provide vapor barrier protection for internal access prior to completion of wall construction. Such effective vapor barrier protection would provide advantageous energy conservation as prevention of the escape of air through the building wall reduces loading on heating and air conditioning operations. A ceiling device protection barrier should also avoid harmful effects that may occur from accumulation of dust or insulation. Such a barrier might also be desirable as a sound barrier.

SUMMARY OF DISCLOSURE

The needs described above are fulfilled, at least in part, by use of a device for sealing an opening in a ceiling vapor barrier membrane. Such device may include a flexible enclosure having a planar member that is to be bonded to the inner side of the membrane. The enclosure is configured with a cavity that can encompass a ceiling mounted electrical device. An aperture in the surface of the planar member is sized to surround the membrane opening. The planar member projects outwardly from the enclosure cavity for fixing the planar member to a ceiling joist. A flange fixed to the planar member extends in an inward direction from the planar member. A fastener is joined to a surface of the flange for bonding with an interior surface of the membrane. The fastener may comprise a removable release liner covering an adhesive. A compressive force manually applied between the planar member and the membrane provides adhesive bonding of the enclosure to the interior membrane surface.

A portion of the flange may be spaced from and parallel to the planar member to form a channel to engage electrical device mounting structure. At least one access site can be provided in the enclosure for introducing an electrical wire from outside the enclosure to the electrical device within the cavity. The enclosure may be sized to fit between adjoining ceiling joists. The enclosure may comprise a generally rectangular configuration, with one side corresponding to a first standard joist spacing and a second side corresponding to a second standard joist spacing. The enclosure thus can be used, by changing its orientation, to meet either joist structure.

Alternatively, an inner portion of the flange may be generally orthogonal to the planar member and extend adjacent the inner perimeter of the planar member. The orthogonal inner portion of the flange may engage a bracket that can support electrical device mounting structure. A retainer can be coupled between the flange and the bracket to secure the engagement therebetween.

A collapsible support structure for the enclosure can be coupled to the bracket. The support structure may contain a plurality of u-shaped support arms having ends rotationally connectable with the bracket and one or more cross bars having ends that engage the support arms. Grooved portions in the support arms can receive the cross bars. Detents at the ends of the cross bars limit rotation of the support arms to positions orthogonal to the planar member and provide a means to lock the support arms in those positions.

The flexible enclosure may be collapsible for insertion through an opening in a pre-existing ceiling substrate or for use in new building construction. The enclosure sides can be compressed to provide a reduced volume for the cavity prior to installation and expanded to increase the cavity volume during installation. For example, the enclosure wall can be bellows-shaped and expanded to fit the clearance between ceiling joists. A support structure, for example, a helical spring can be inserted into the enclosure in its expanded state to prevent collapse of the enclosure from the weight of insulation or the like.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1b is an exploded perspective view of the assembly of FIG. 1a;

FIG. 2b is a partial section view of the assembly of FIG. 2a;

FIG. 3 is a perspective view of a modification of the assembly of FIG. 1a;

FIG. 4a is a perspective view of a modification of the assembly of FIG. 1a;

FIG. 4b is a top perspective view of the assembly of FIG. 4a;

FIG. 5b is a top perspective view of the assembly of FIG. 5a;

FIG. 7b is an exploded view of the vapor barrier assembly of FIG. 7a;

FIG. 13d is a section view of the assembly shown in FIG. 13a;

FIG. 14a is an exploded view of an alternative vapor barrier assembly device suitable for installation during rough-in stage of new construction;

FIG. 14b is perspective view of the assembly of FIG. 14a installed on a bracket;

FIG. 14c is a partial section view of the assembly shown in FIG. 14b;

FIG. 17b is an exploded view of the grommet assembly of the device shown in FIG. 17a;

FIG. 18b is an exploded view of the vapor barrier assembly shown in FIG. 18a;

FIG. 19b is a different perspective view of the vapor barrier assembly of FIG. 19a;

FIG. 20b is a partial section view of the assembly shown in FIG. 20a; and

FIG. 21b is section view taken at 21'-21' of FIG. 21a;

FIG. 22b is a section view of the assembly shown in FIG. 22a;

FIG. 23b is section view taken at 23'-23' in FIG. 23a;

FIG. 24b is a section view taken at 24'-24' in FIG. 24a;

FIG. 24d is another section view of the assembly shown in FIG. 24a;

FIG. 25b is a section view taken at 25'-25' in FIG. 25a;

FIG. 26b is a detail view of the upper portion of the support structure shown in FIG. 26a;

FIG. 26c is a detail view of the lower corner of the bracket assembly shown in FIG. 26a;

FIG. 28b is a section view of the unexploded assembly shown in FIG. 28a; and

FIG. 29b is a section view taken at 29'-29' in FIG. 29a;

DETAILED DISCLOSURE

Figure 1A:
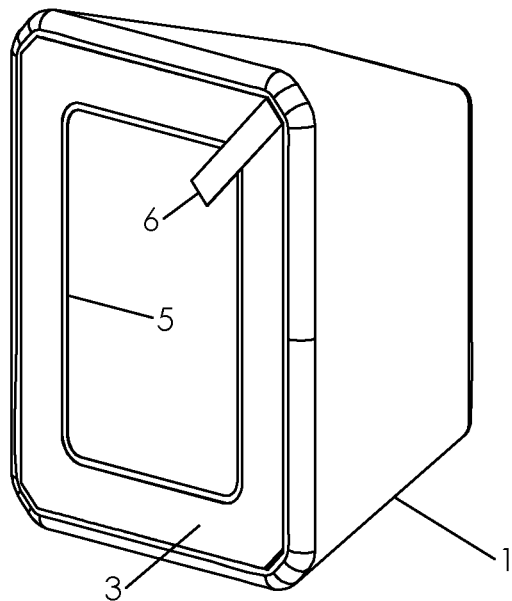
FIG. 1a is a perspective view of a preferred embodiment of a vapor barrier assembly device suitable for installation in a pre-existing wall.
Figure 1B:
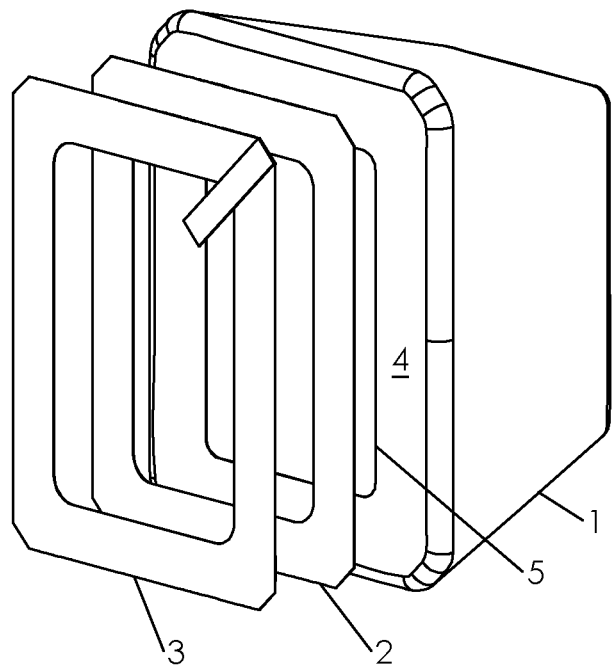

As shown in the perspective view of FIG. 1a and the exploded view of FIG. 1b, enclosure 1 can be used to seal a hole in an air/vapor barrier membrane situated behind drywall 8 in a building. Enclosure 1 can be made of a flexible material, such as 0.006 thick polyethylene or the like, by blow molding. Adhesive 2 and release paper 3 are applied to the planar surface 4 around the aperture 5. Pull tab 6 allows the release liner to be withdrawn after the enclosure is in place.

Figure 1C:
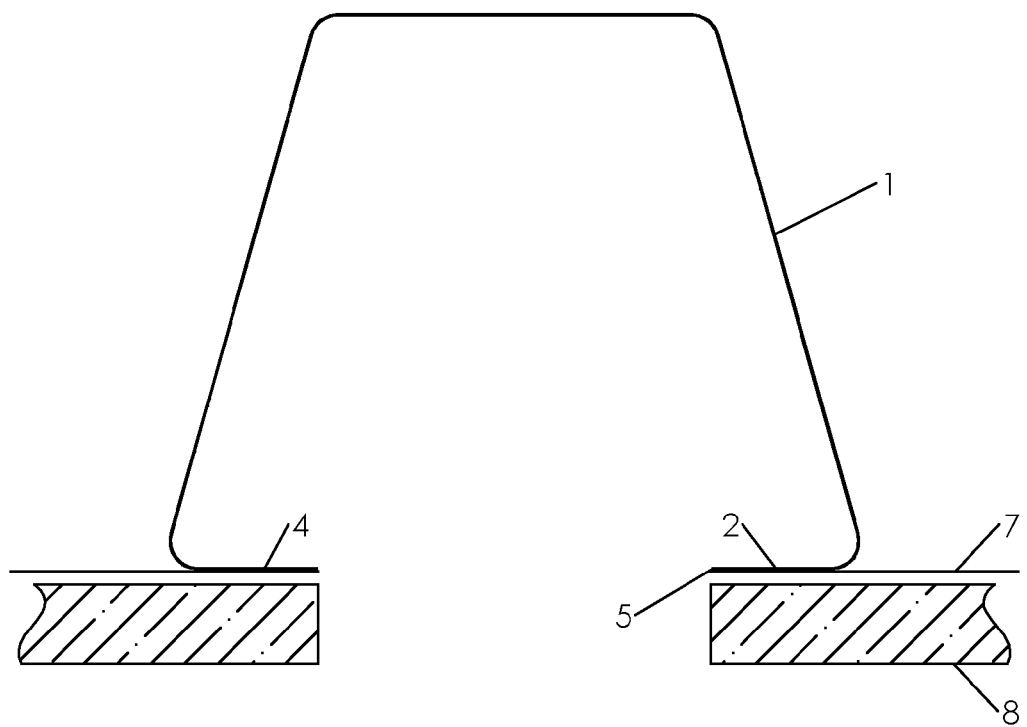
FIG. 1c is a section view of the assembly of FIG. 1a adjacent a drywall.

FIG. 1c shows the enclosure 1 in section view, positioned behind drywall 8. A planar member having a surface 4 of the enclosure is bonded with adhesive 2 to the inner side of the barrier membrane 7 that surrounds an opening in the membrane. The planar member provides an undercut to facilitate manual access to the inside of the planar member. In installation, a finger, hand or tool can be inserted into the enclosure 1 to apply pressure to the opposite side of planar surface 4 to compress the adhesive 2 and bond the enclosure surface to membrane 7. The cavity formed by enclosure 1 is thus sealed to the membrane 7 by an easily performed, time efficient procedure.

Figure 1D:
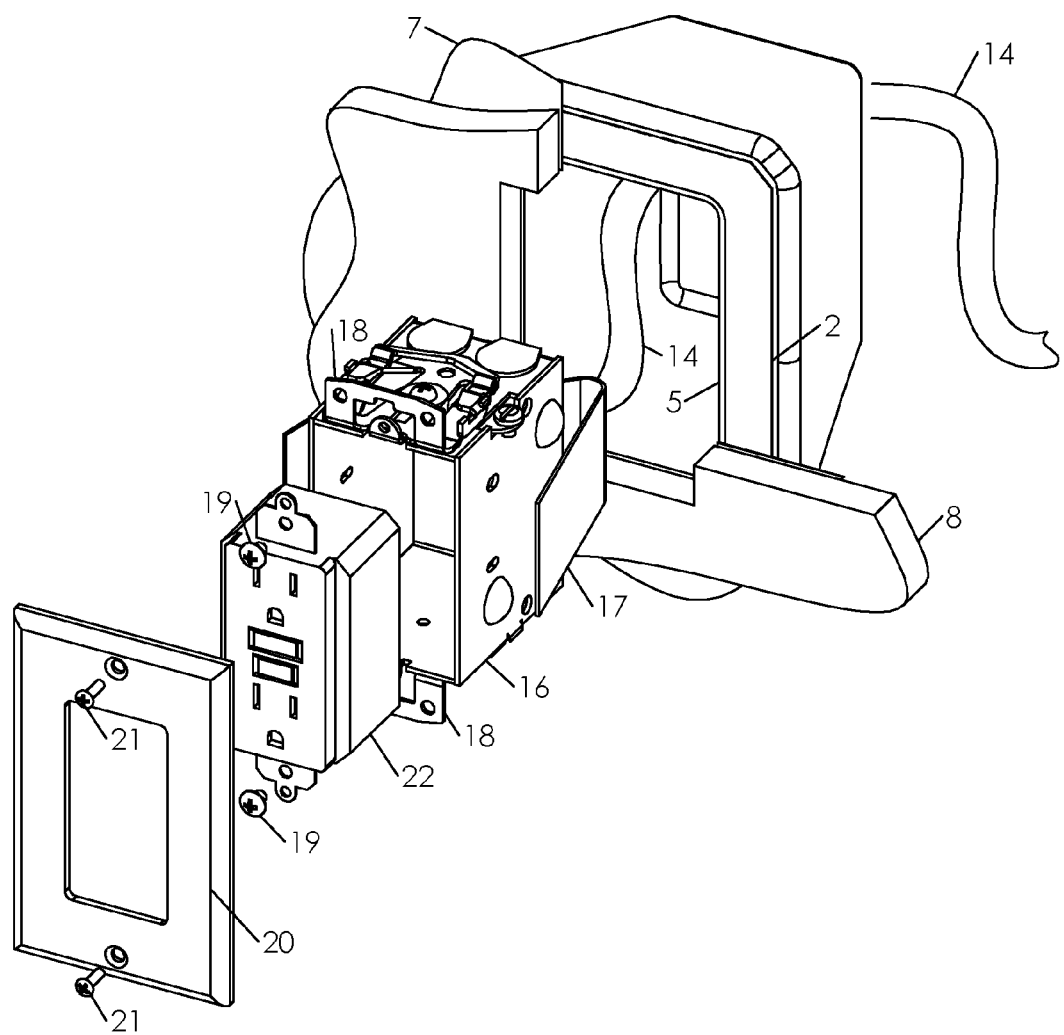
FIG. 1d is an exploded perspective view of the assembly of FIG. 1a in use with an electrical device.
Figure 1E:
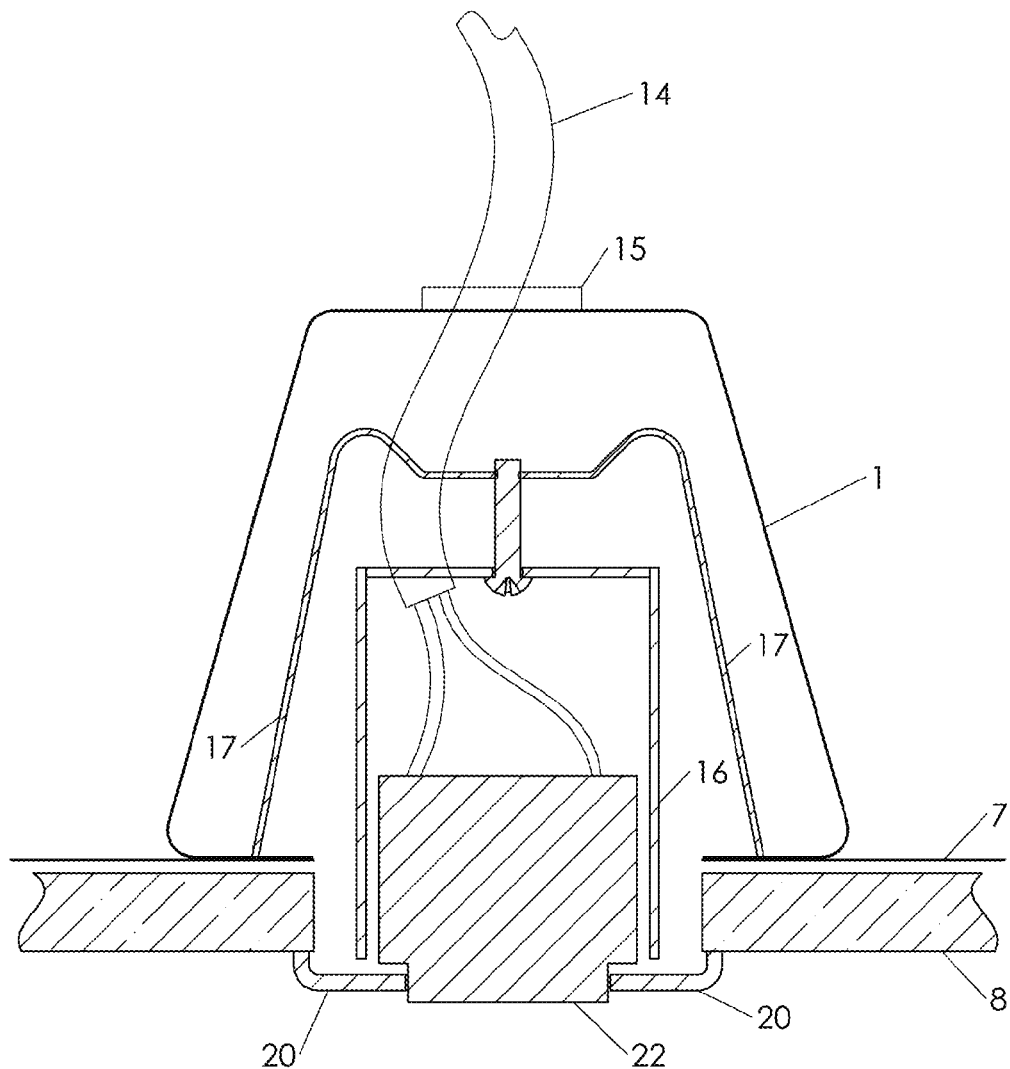
FIG. 1e is a section view of the assembly shown in FIG. 1d.

FIG. 1d is an exploded view of an installation of an electrical device assembly in the opening of drywall 8 in combination with barrier member 7 sealed by enclosure 1. FIG. 1e is a section view of the combination. A line voltage electrical cable 14 has been fished through the wall cavity behind the drywall 8 and vapor barrier 7 and fed through a rework hole in the vapor barrier 7. Prior to application of enclosure 1 to membrane 7, the electrical cable has been fed through the enclosure via a cable sealing feature 15, shown in FIG. 1e, which forms a seal around the wire to prevent air or vapor from passing through the enclosure penetration. Sealing feature 15 may be replicated at another enclosure access site if an additional wire connection is needed. Sealing feature 15 may comprise a reduced wall thickness in the enclosure wall that will encompass the cable as it pierces the wall. Alternatively, felt, foam, rubber or alternative material gaskets can be bonded to the enclosure wall to facilitate piercing while maintaining the air/vapor seal. A cut can be made in the gasket material to locate the wire piercing location and to seal around it as it passes through the enclosure wall while preventing the propagation of the tear in the wall caused by piercing. Alternatively, caulk can be dabbed around the piercing location if no other means is provided.

Enclosure 1, having passed through the opening in the drywall 8 and vapor barrier membrane 7, has been bonded via the adhesive 2 to the vapor barrier 7. The electrical cable 14 has been fed to electrical box 16. Electrical box 16 can then be installed in wall 8. The box 16 is inserted through the opening in the drywall 8 and vapor barrier 7 as well as the aperture 5 of the enclosure until ears 18 of box 16 (FIG. 1d) rest on the front face of wall 18. A screw in the back of the electrical box 16 can be tightened to move rework attachment plates 17 toward the drywall 8 and apply pressure between box 16 and wall 8. After wiring an electrical outlet 22 or other device, such as an electrical switch, it is secured to the electrical box 16 with screws 19. Wall plate 20 is fastened to the outlet 22 with two screws 21. Although a single electrical box has been illustrated, enclosure 1 can be dimensioned to accommodate two or more ganged electrical boxes.

Figure 2A:
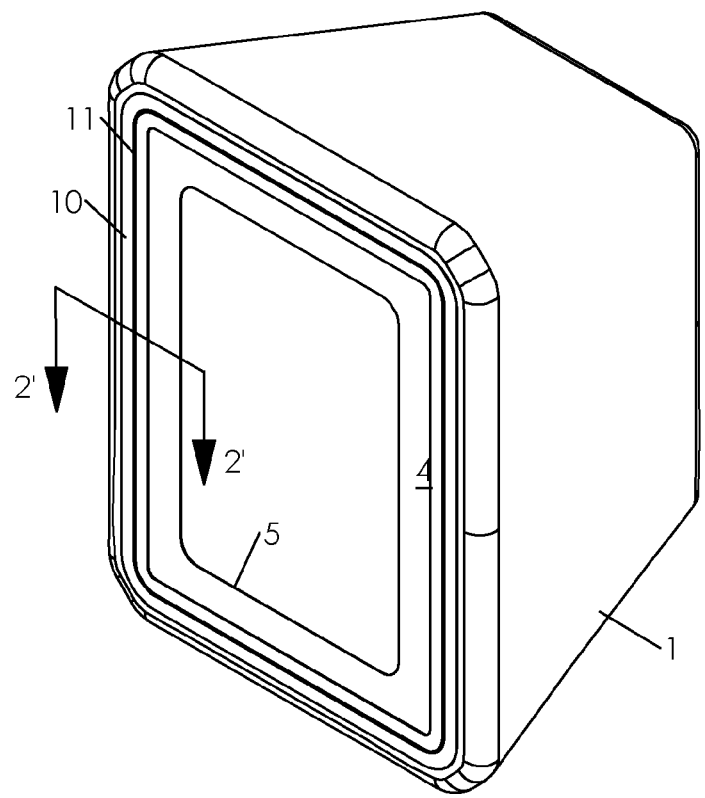
FIG. 2a is a perspective view of a second embodiment of a vapor barrier assembly with an integral blister pack containing a bonding adhesive.
Figure 2B:
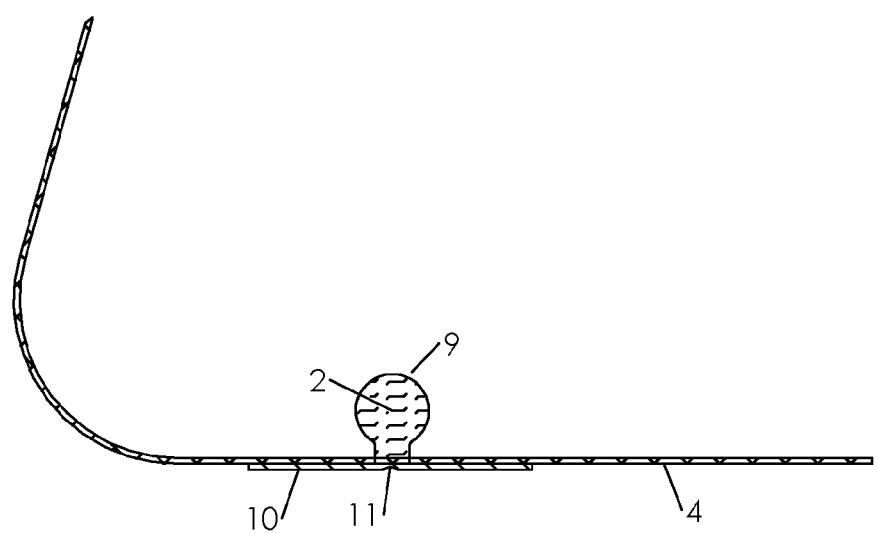

An alternative embodiment of a vapor barrier assembly device is illustrated in FIG. 2a and in partial section 2'-2' in FIG. 2b. This embodiment differs from the device of FIG. 1a in the use of a different bonding means. A blister pack cavity 9 contains an adhesive 2 preserved hermetically with a lidding 10. Lidding 10 may be constructed of polyethylene or like material. Lidding 10 has an area of reduced thickness 11 adjacent the blister pack cavity 9. Lidding 10 can be ultrasonically welded to the planar surface 4 of the enclosure or bonded using an alternative adhesive. Similar to the installation described with respect to FIG. 1a, pressure can be applied to blister pack cavity 9 on the opposite side of planar surface 4 to break lidding 10. Adhesive 2 is then compressed between surface 4 of the enclosure and the membrane 7 to seal the two together. Other suitable materials, e.g., aluminum foil, may be used as a lidding material in this embodiment.

Figure 3:
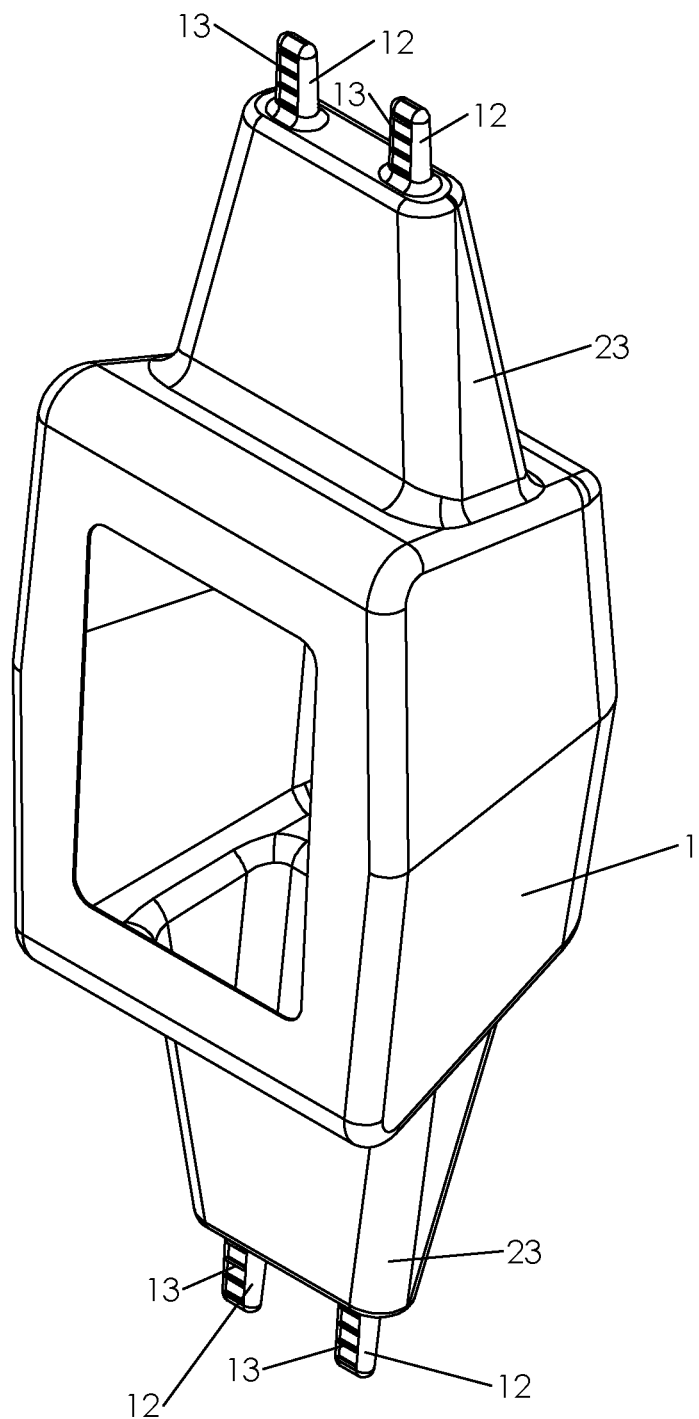

An alternative embodiment of a vapor barrier assembly device is illustrated in FIG. 3. This embodiment differs from that of FIG. 1a by expansion of upper and lower portions of enclosure 1 by pyramidal portions 23. Conically shaped forms 12 serve as access sites for introducing electrical wires into the enclosure cavity from the space behind drywall 8. Any number of such conically shaped forms may be utilized as required by the particular needs of the electrical device to be installed. Gradations 13 on the conical forms 12 indicate cut locations for penetrating and sealing around different size wire, pipe or other entity. After cutting conical form 12 at the appropriate gradation 13 and inserting the wire, a strip of tape can be wrapped around the conical shape and the wire to ensure a positive seal. Alternatively, the material of the conical form may be made sufficiently resilient to squeeze the wire and ensure a positive seal. The conical forms 12 can be pushed inside out after cutting to facilitate insertion of wires. If only a single wire is needed to penetrate the enclosure only one of the conical forms would be cut or punctured. The pyramidal portions 23 allow space for extra wire that may be needed for wiring the box when outside the wall and then contained within the enclosure after installation of the box.

Figure 4A:
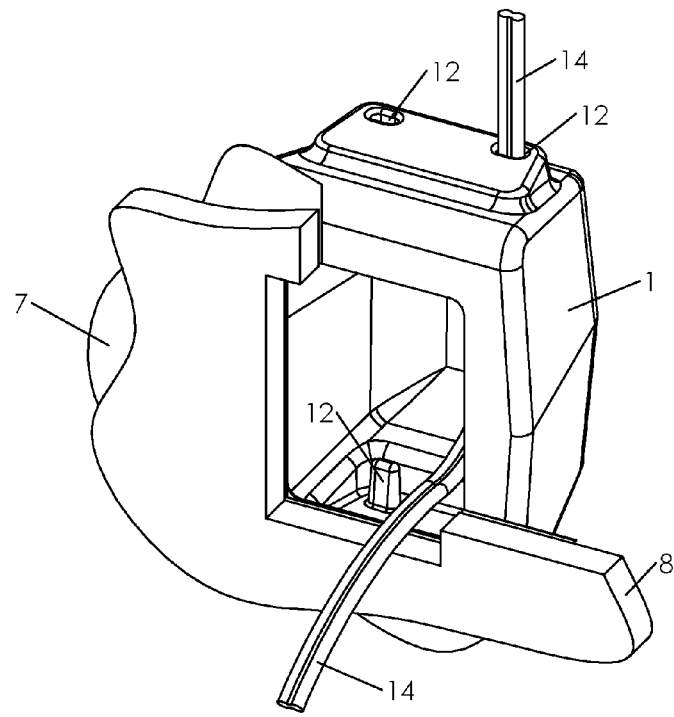
Figure 4B:
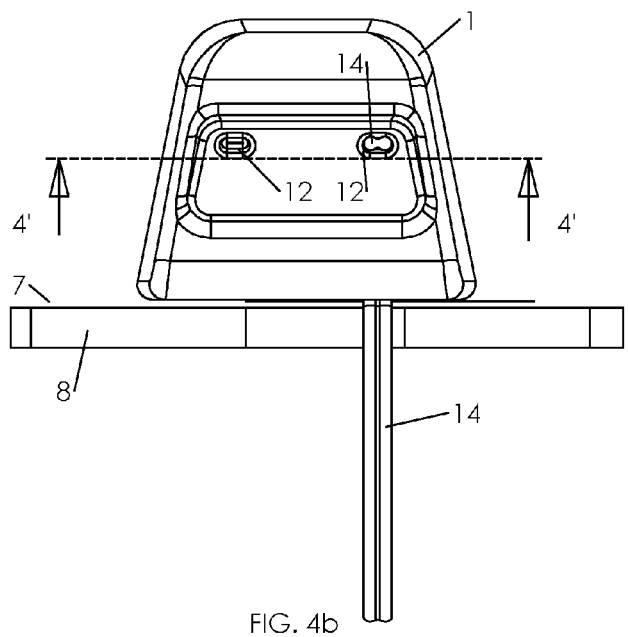
Figure 4C:
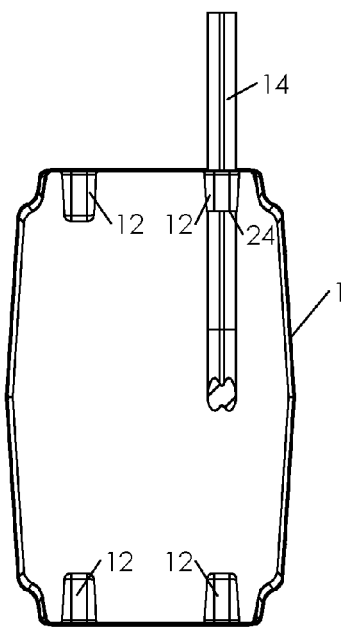
FIG. 4c is a section view of the assembly of FIG. 4b.
Figure 4D:
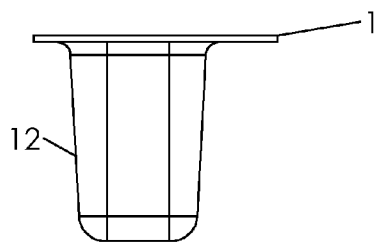
FIGS. 4d-4j are detail views of projection elements of the assembly of FIG. 4a and variations thereof.

Another alternative embodiment is illustrated in FIGS. 4a-4c. Conical forms 12 project into the enclosure 1 to serve as access sites facilitating insertion of the wire or other penetrating element. As shown in the section view of FIG. 4c, conical form 12 has been cut or punctured at 24. The resiliency of the material squeezes the wire 14 and ensures a positive seal. FIG. 4d shows the conical form 12 in detail, prior to cutting.

Figure 4E:
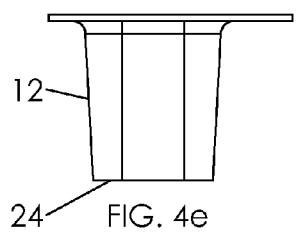
Figure 4F:
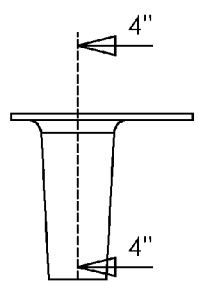
Figure 4G:
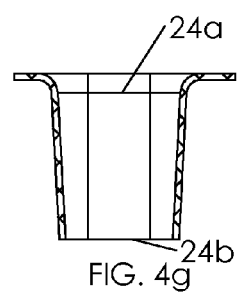
Figure 4H:
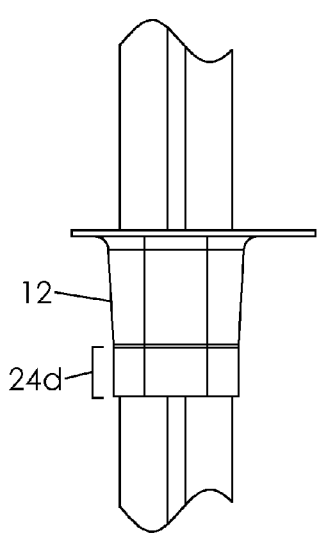
Figure 4I:
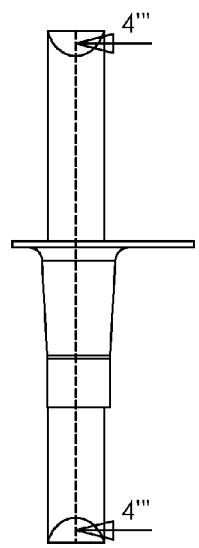
Figure 4J:
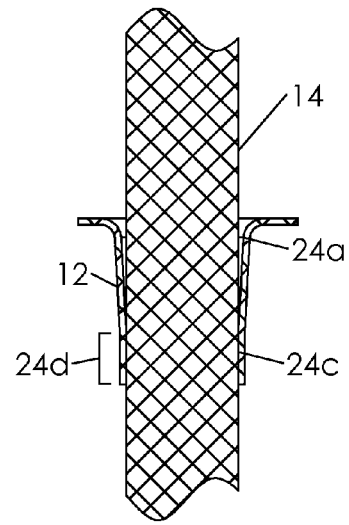

Any of a plurality of different size conical forms that correspond to the size of the wire to be introduced into the cavity may be utilized. FIGS. 4e and 4f illustrate two different conical forms 12 in detail cut along edge 24 prior to insertion of the wire 14. Section 4"-4" of FIG. 4f is shown in FIG. 4g. The dimension of the conical form at the top 24a is larger than the wire to facilitate insertion of the wire into the form. The dimension 24b at the bottom of the conical form is smaller than the wire and stretches as the wire is inserted. FIGS. 4h-4j, which correspond to FIGS. 4e-4g, show wire 14 passing through and sealed in conical form 12. Section 4'"-4'" of FIG. 4i is shown in FIG. 4j. The contact surface 24c in the stretched portion 24d around the wire creates a seal. The resiliency of the enclosure material permits the stretching. Alternatively, a conical form of different material from that of the enclosure material can be bonded to the enclosure.

Figure 5A:
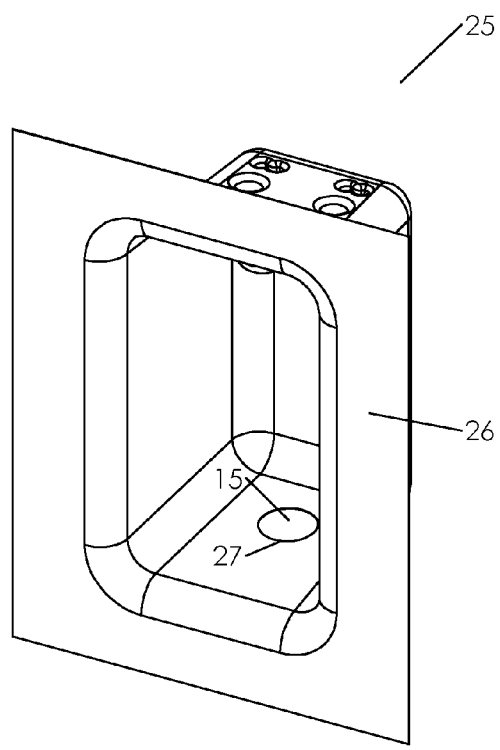
FIG. 5a is a perspective view of a vapor barrier assembly device suitable for installation during rough-in stage of new construction.
Figure 5B:
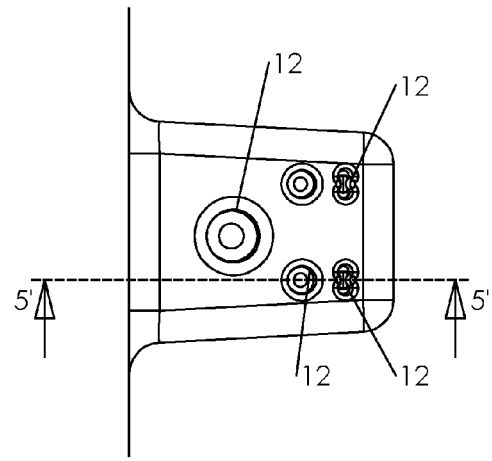
Figure 5C:
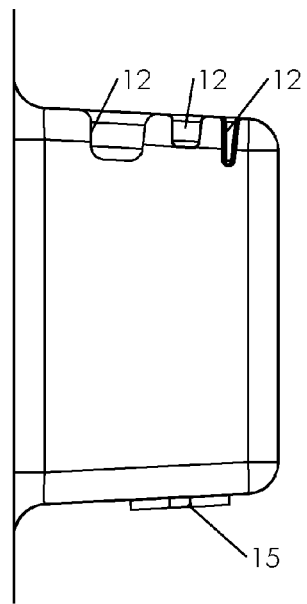
FIG. 5c is a section view of the assembly of FIG. 5b.

The alternative embodiment, illustrated in FIGS. 5a-5c, is a rough-in enclosure 25 which can be installed with an electrical box during the rough-in stage of new construction. Front flange 26 is taped to a polyethylene membrane. As shown, conical forms 12 may be designed to receive conduit, wire and armored cable of differing sizes. The inward direction of the conical forms 12 facilitates installation of the penetrating entity. An aperture 27 is located in the bottom wall of enclosure 25. Foam 15 is bonded to the enclosure to encompass aperture 27 and serve as an access site for piercing the enclosure without compromising the vapor barrier. Other means of sealing the penetrating entity described in other embodiments are applicable to this embodiment.

Figure 6:
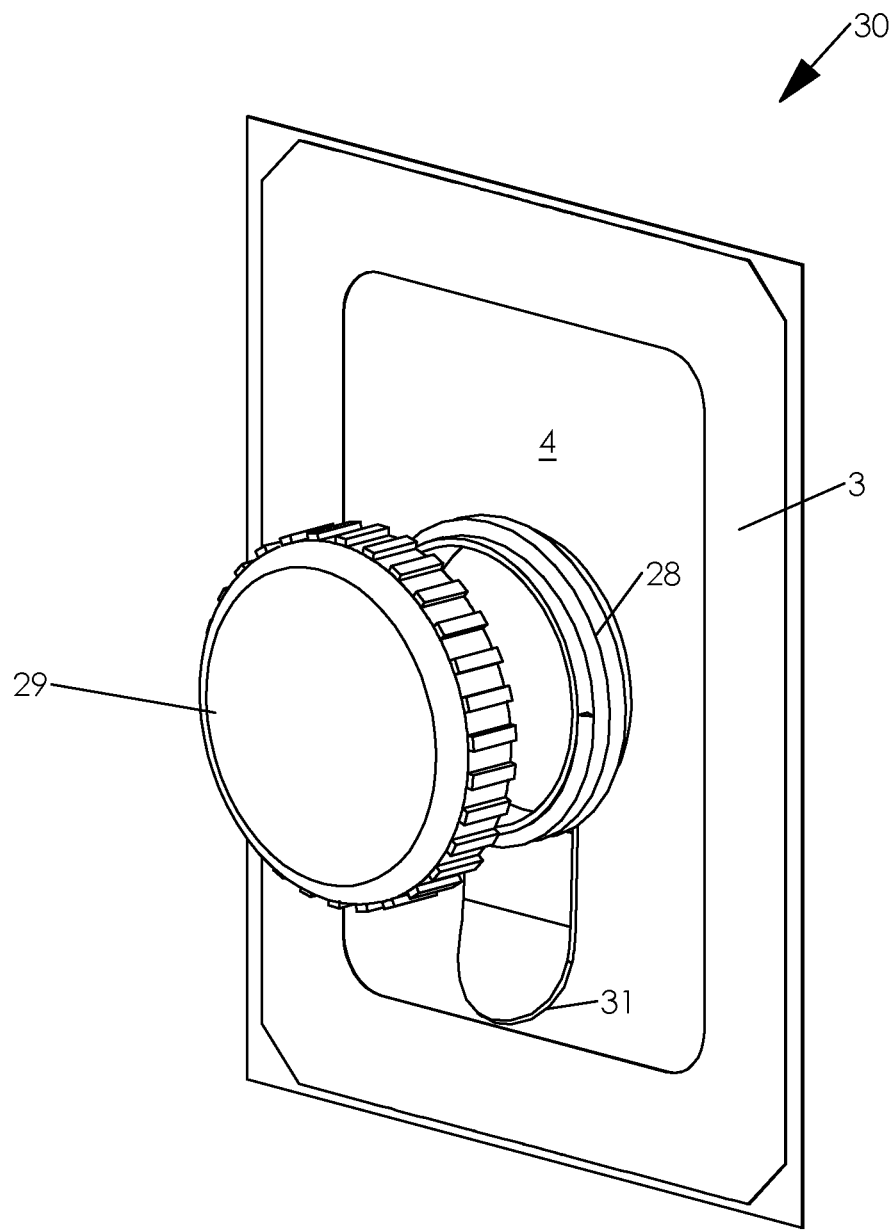
FIG. 6 is a perspective view of a vapor barrier assembly that permits manual access to a wall interior.

An alternative vapor barrier assembly that permits manual access to a wall interior is shown in FIG. 6. Assembly 30 is a generally planar entity rather than an enclosure as shown in the previous embodiments. Threaded port 28 integral to planar surface 4 permits access, with a finger, hand or tool, to the far side of the assembly 30 in order to apply pressure and bond to the far side of the membrane being repaired. Release liner 3 protects the adhesive until the assembly is in place and can then be removed to permit bonding. After bonding, the threaded cap 29 is threaded onto the threaded port 28 to ensure that a hermetic seal is created. Tab 31, bonded to the threaded port 28, is held when cap 29 is being tightened in order to provide an equal and opposite force without straining the bond. The threaded elements can be manufactured by injection molding and laminated or ultrasonically welded to the planar surface 4.

Figure 7A:
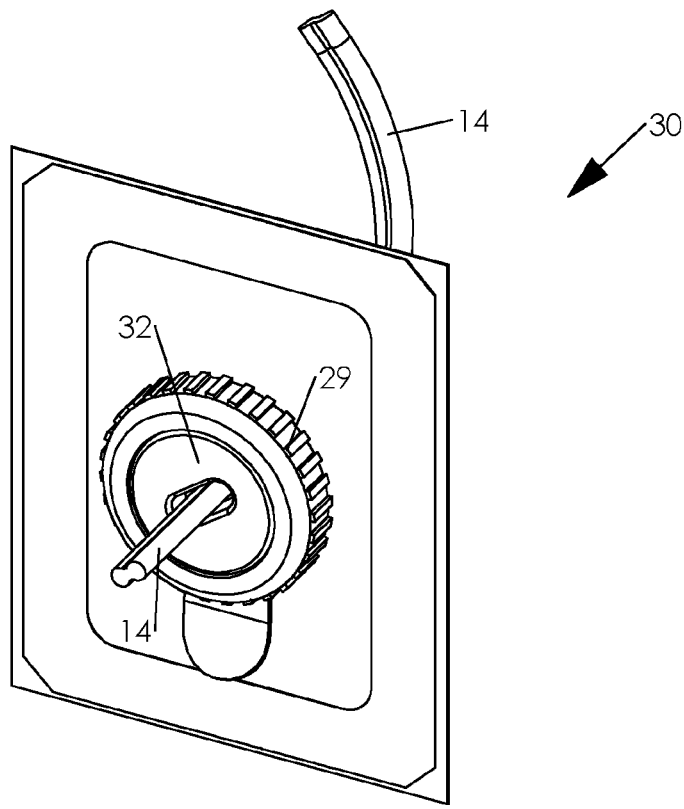
FIG. 7a is a perspective view of a vapor barrier assembly for sealing an electrical wire.
Figure 7B:
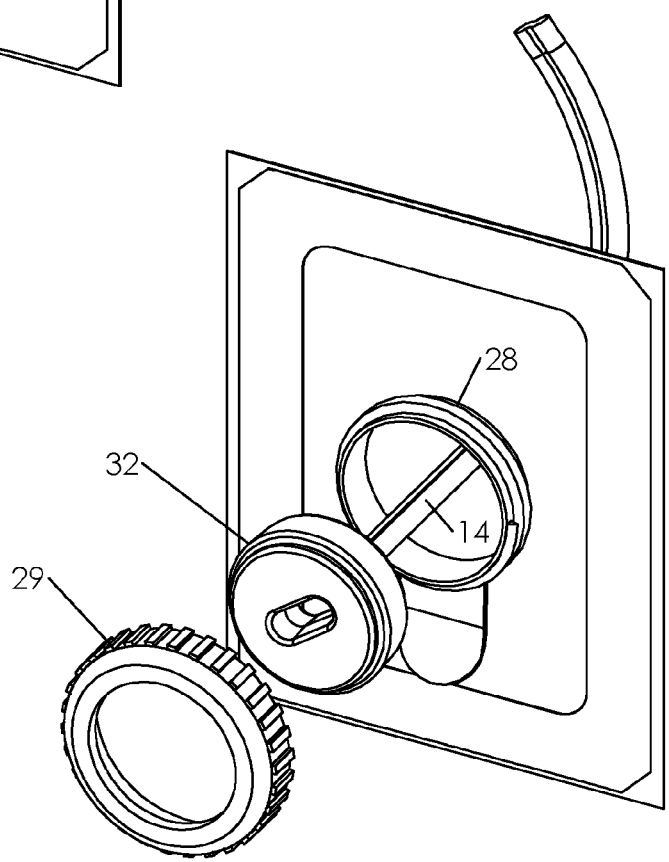

FIGS. 7a and 7b illustrate a modification of the assembly shown in FIG. 6, wherein access of a wire from the space behind wall 8 can be made while maintaining vapor seal functionality. A tapered elastomeric gland 32, when compressed between threaded port 28 and cap 29 will compress the wire 14 or other penetrating entity and maintain the hermetic seal across the membrane. This compressed gland means of sealing around the wire can also be applied to an enclosure similar to the one shown in FIG. 1.

Figure 8:
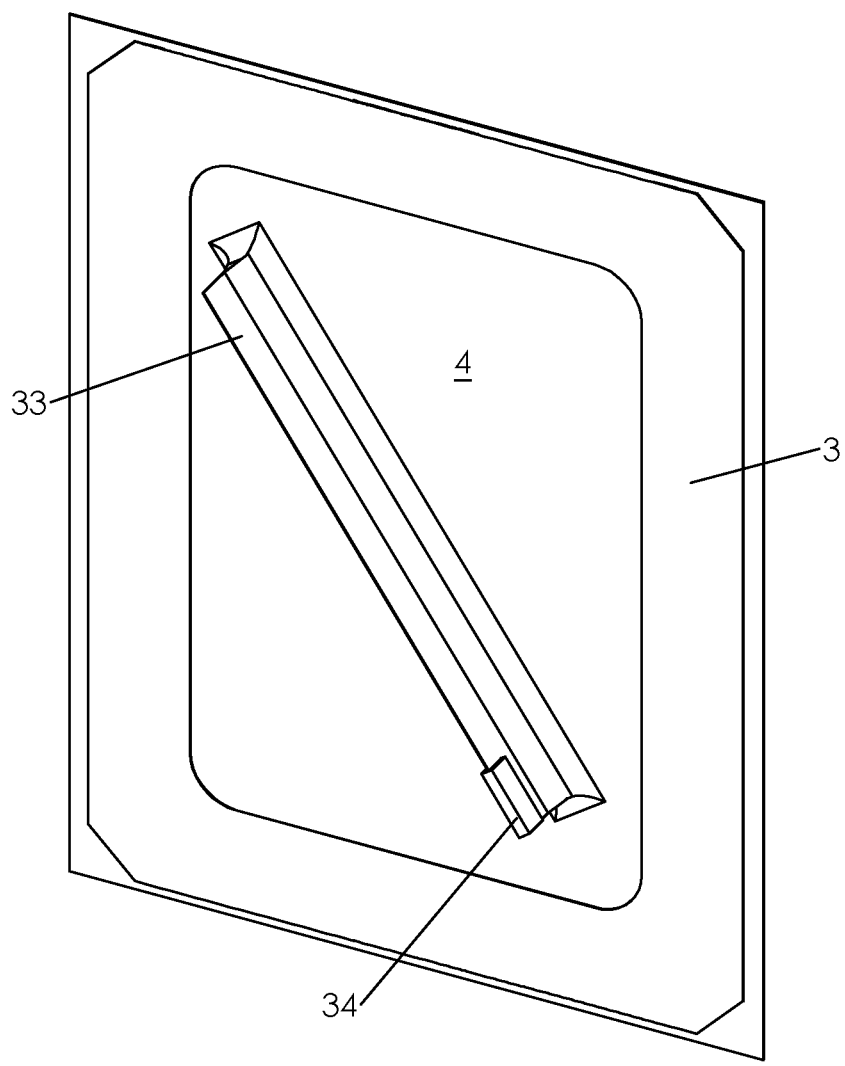
FIG. 8 is a front view of a vapor barrier assembly having a zipper lock device for permitting manual access to a wall interior.

An alternative to the embodiment of FIG. 6 is shown in perspective in FIG. 8. A zipper lock type device 33 permits access to the far side of the planar surface 4. A finger, hand or tool may be inserted through the aperture in the zipper lock device 33 in order to apply force on the far side of the planar surface 4 to facilitate bonding after surface 4 is in place and adhesive release liner 3 is removed. The finger, hand or tool can then be removed and the zipper lock device 33 closed to complete the seal. Slider 34 facilitates opening and closing of the aperture in the zipper lock device 33. This assembly permits continued re-sealable access through the barrier. For example, the assembly would facilitate access to a seasonally adjusted water valve located within the wall cavity behind the vapor barrier. The assembly can be manufactured by ultrasonically welding the zipper lock device to the planar surface 4, which can be prepared by die cutting. Similarly, the adhesive and release liner can be prepared for assembly by die cutting.

Figure 9:
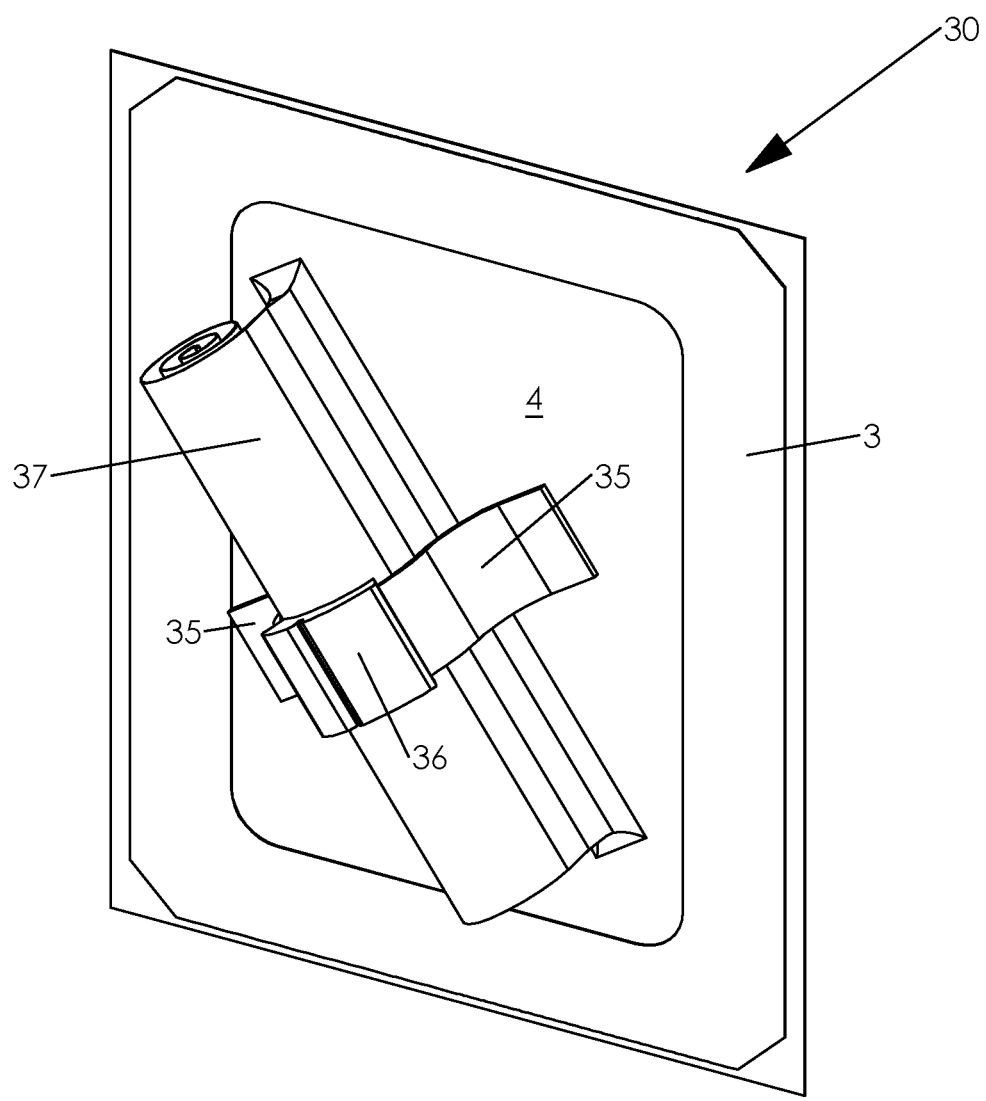
FIG. 9 is a perspective view of a vapor barrier assembly having a tubular entity and retainer to permit access to a wall interior.

An alternative embodiment is illustrated in FIG. 9. Assembly 30 includes a tubular entity 37 that extends from planar surface 4. Access to the far side of surface 4 is achieved by inserting a finger, hand or tool through the tubular entity 37. The adhesive release liner 3 is removed after the assembly is in place to permit bonding. Once bonding is complete, the tubular entity is rolled up and secured in place with clasp 36 on strap 35. Entity 37 may be laminated or hermetically stitched to the planar surface 4, creating a hermetically sealed assembly. As a further modification, the clasp can be located on opposite sides at the outward extremities of the tubular entity and secured thereto after rolling to create the seal. Tape can be employed in lieu of a clasp.

Figure 10:
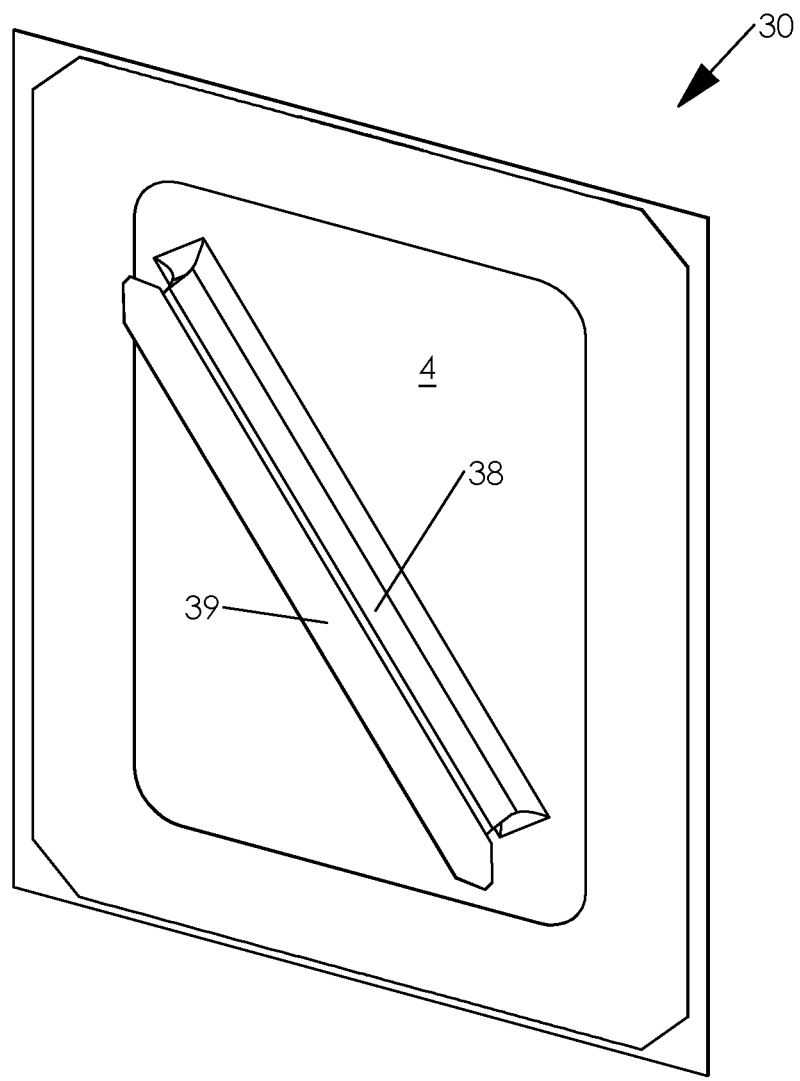
FIG. 10 is a perspective view of a variation of the vapor barrier assembly of FIG. 9.

A further modification of the assembly of FIG. 9 is shown in FIG. 10. Assembly 30 comprises a short tubular entity 38 which extends from planar surface 4. The short tubular entity 38 permits access to the far side of the surface 4 for bonding to the membrane to be repaired. After bonding, tape 39 can be applied to an outward edge of the short tubular entity 38 to create the seal. The tape can be integral to the short tubular entity with a release liner that is removed in order to seal planar surface 4.

Figure 11:
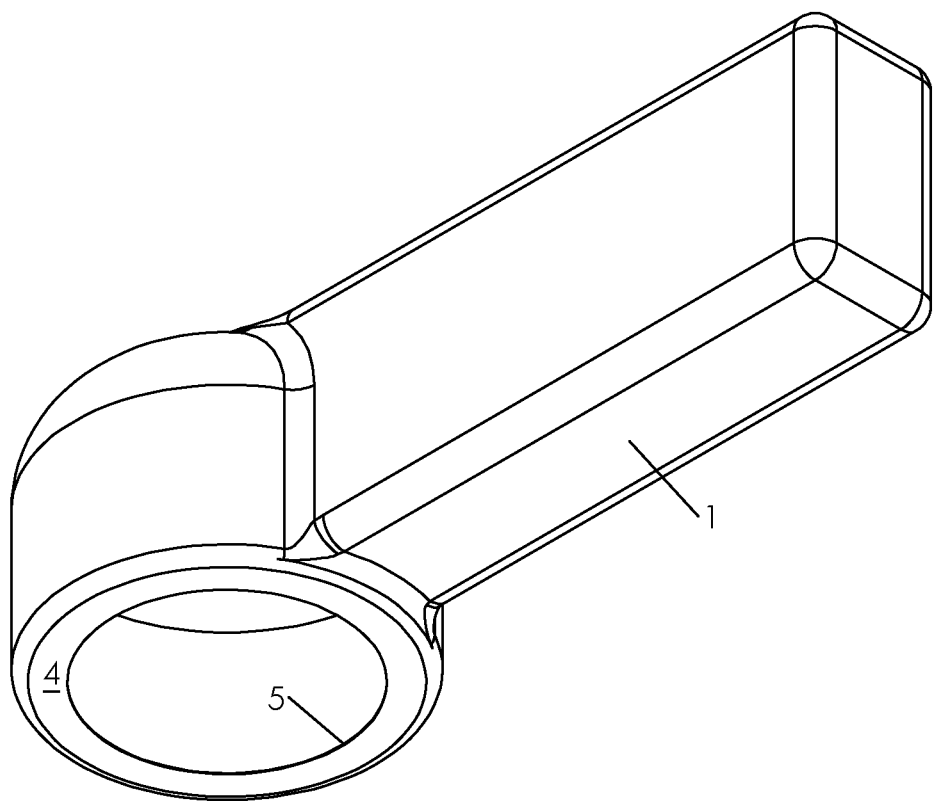
FIG. 11 is a perspective view of an embodiment of a vapor barrier assembly for housing a recessed light fixture assembly.
Figure 12:
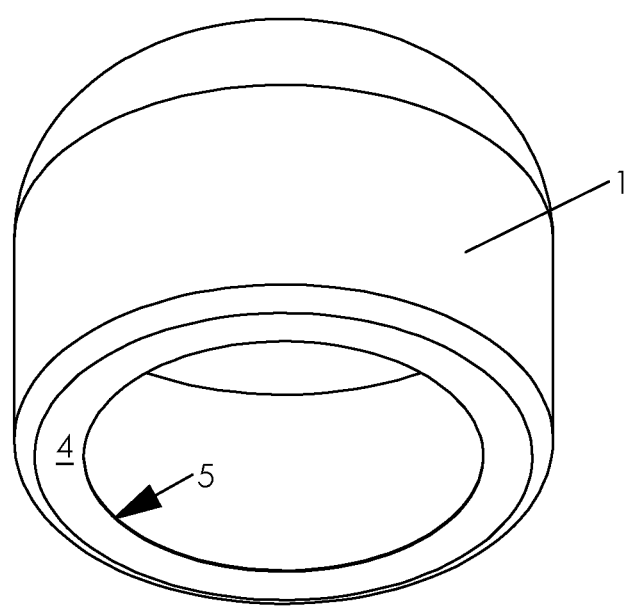
FIG. 12 a perspective view of an alternative embodiment of a vapor barrier assembly for housing a recessed light fixture assembly.

FIG. 11 is a perspective view of a vapor barrier assembly that is suitable for maintaining an air/vapor seal around a recessed ceiling light fixture. The recessed light fixture would have low heat generation, e.g. an LED, and would be of the rework type which does not require access to the space above the ceiling. This type of fixture typically is connected to a junction box with a transformer extending from the light engine. Similar to the installation shown in FIG. 5 and FIG. 6, after the enclosure is inserted through the opening in the ceiling and the existing vapor barrier above the ceiling, planar surface 4 is bonded to the vapor barrier via a bonding means such as shown in FIG. 1. The fixture can then be passed through the opening in the ceiling, the vapor barrier and aperture 5. The fixture can then be secured in the ceiling in any conventional manner, such as by screw tightening arms that sandwich the ceiling substrate against the fixture's flange on the lower surface of the drywall. The fixture will be housed within the enclosure 1 and the continuity of the existing vapor barrier will be maintained. The enclosure can be manufactured by blow molding and an adhesive applied to planar surface 4. This embodiment can be modified to accommodate recessed light fixtures of other configurations, as illustrated in FIG. 12. Enclosure 1, with planar surface 4 and aperture 5, is suitable for maintaining an air/vapor seal around a recessed light fixture or other ceiling or wall mounted object.

Figure 13A:
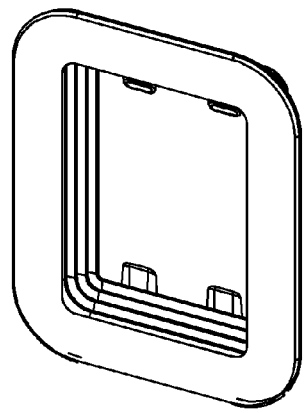
FIG. 13a is a perspective view of an alternative collapsible vapor barrier assembly shown in a collapsed state.
Figure 13B:
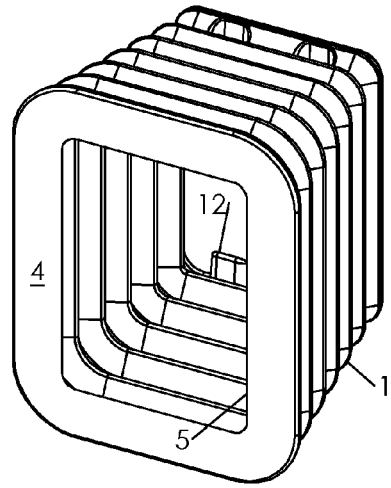
FIG. 13b is a perspective view of the vapor barrier assembly of FIG. 13a shown in an expanded state.
Figure 13C:
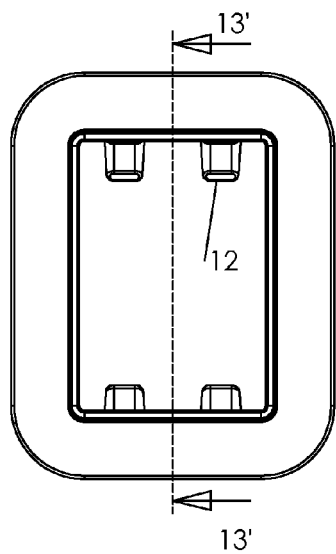
FIG. 13c is a front view of the collapsible assembly shown in FIGS. 13a and 13b.
Figure 13D:
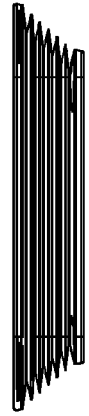
Figure 13E:
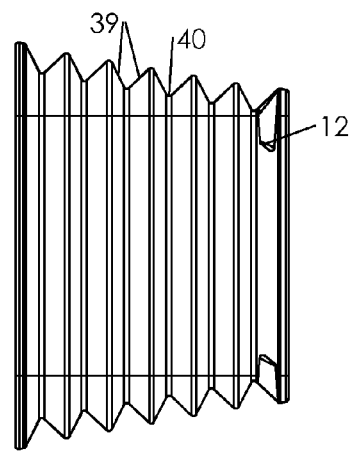
FIG. 13e is a section view of the assembly shown in FIG. 13b.

FIGS. 13a-13e illustrate an alternative embodiment of a vapor barrier assembly having an accordion or bellows like enclosure. Such configuration facilitates collapsibility for reduced volume for shipment and storage, as well as for easing passage through the hole in the opening in the wall. FIG. 13a is a perspective view of the enclosure in its collapsed state. FIG. 13b is a perspective view of the enclosure in its expanded state. Adhesive and release liner are applied to planar surface 4 in order to fix the enclosure to the membrane, as described in with respect to FIG. 1a. Aperture 5 permits access to the enclosure 1. FIG. 13c is a front view for both states. Conical forms 12 extend inside the enclosure. FIG. 13d is a section view 13' of FIG. 13c in the collapsed state. FIG. 13e is a section view 13' from FIG. 13c in the expanded state. The ends of conical forms 12 can be snipped when needed during installation with scissors or knife edge to permit passage and sealing of respective wires. Flat accordion-like surfaces 39 when collapsed lay substantially flat against each other. Bend lines 40 facilitate the collapse and expansion. The enclosure is tapered to ensure that bends do not align with each other when collapsed in order to provide maximum compression.

Figure 14D:
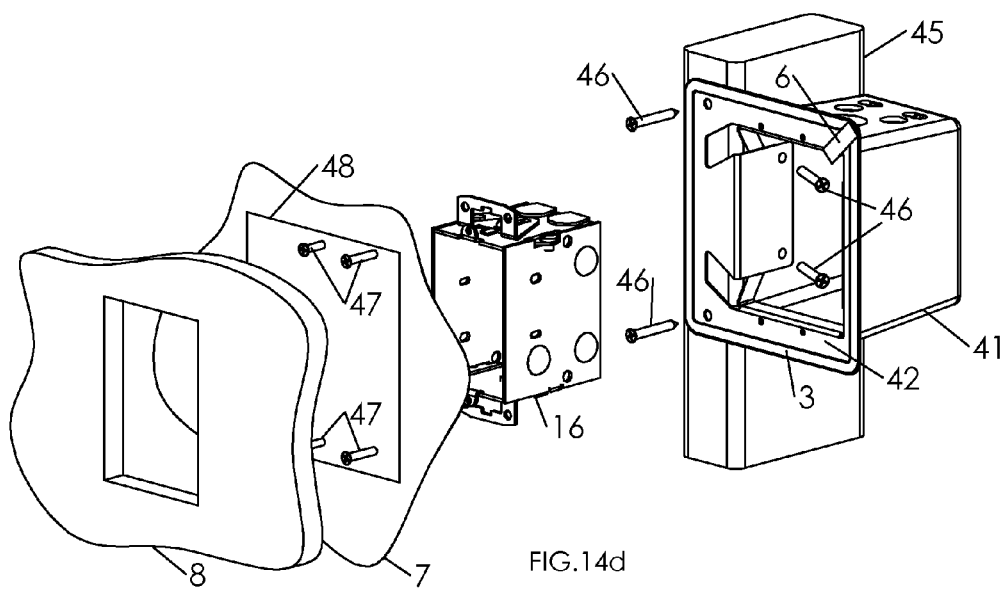
FIG. 14d is an exploded view of the vapor barrier assembly of FIG. 14a when fully installed with a building wall.

FIGS. 14*a-d* illustrate a vapor barrier assembly for new construction. FIG. 14*a* is an exploded view of vapor barrier enclosure 41 and sheet metal bracket 42. Enclosure 41 may be fabricated by injection molding with a resilient material, such as thermoplastic polyurethane. Enclosure 41 includes wire access sites such as described earlier in more detail with respect to FIGS. 5*a* and 5*b*. FIG. 14*b* is a perspective view enclosure 41 mounted on bracket 42. To install enclosure 41 on bracket 42, flexible flange 43 of the front surface of the enclosure is stretched over the bracket front face outside edge 44, as illustrated more clearly in the partial section view of FIG. 14*c*. Adhesive and release liner are applied to the surface 43 at its outer face. Pull tab 6, shown in FIG. 14*d*, allows the release liner 3 to be withdrawn after the enclosure is in place.

Figure 14E:
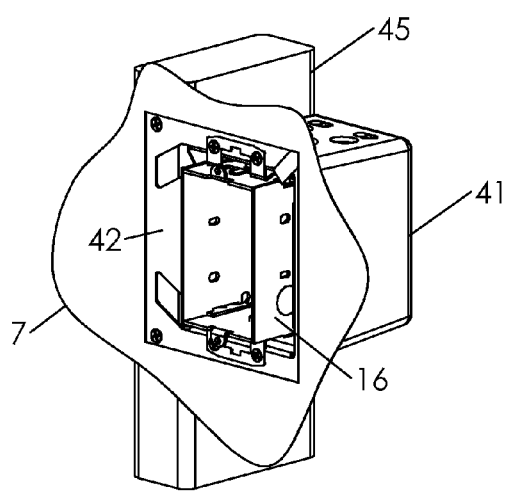
FIG. 14e is a perspective assembled view of the vapor barrier assembly of FIG. 14a when fully installed with a building wall.

FIG. 14*d* is an exploded view of the assembly mounted to a stud 45, with electrical box 16 contained in the enclosure cavity and installed behind wall 8. FIG. 14*e* is a perspective view the mounted assembly. Fasteners 46 inserted through holes in bracket 42 hold the bracket and enclosure 41 to the stud 45. Electrical box 16 is mounted to the bracket with fasteners 47. Thereafter, vapor barrier membrane 7 is applied over enclosure 41 and an aperture 48 is cut to allow access to the box 16. An installer can reach through the aperture, and grasp the release liner pull tab 6 to expose the adhesive and bond the enclosure 41 to the membrane 7 by applying pressure to the outside of the membrane in the area of the adhesive. In lieu of the adhesive and release liner, the membrane aperture can be sized such that the membrane can partially overlap the front surface 43 of the enclosure where tape can be used to make the seal. The drywall 8 can be installed in conventional manner.

Figure 15:
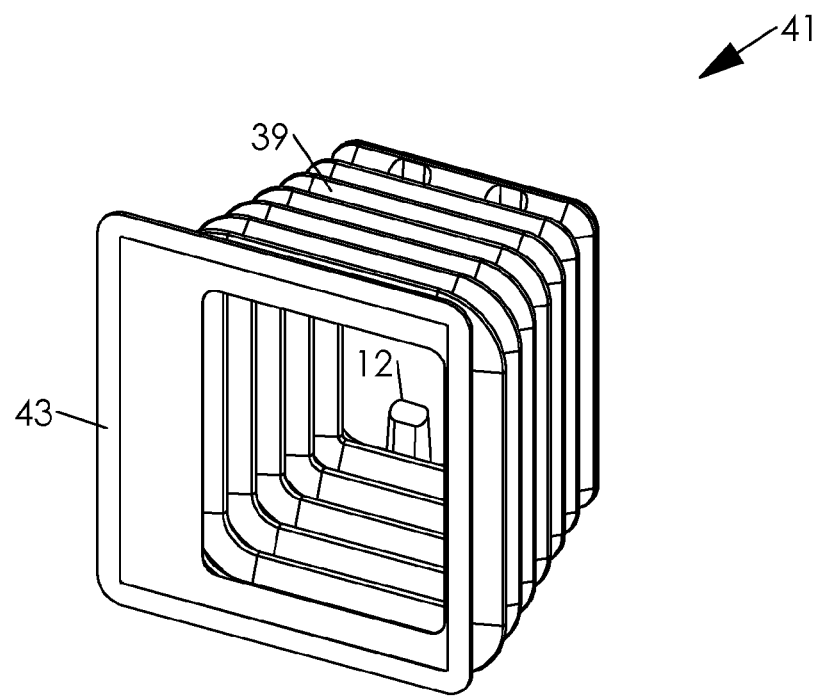
FIG. 15 is a perspective view of an alternative collapsible assembly device suitable for installation during rough-in stage of new construction.
Figure 16:
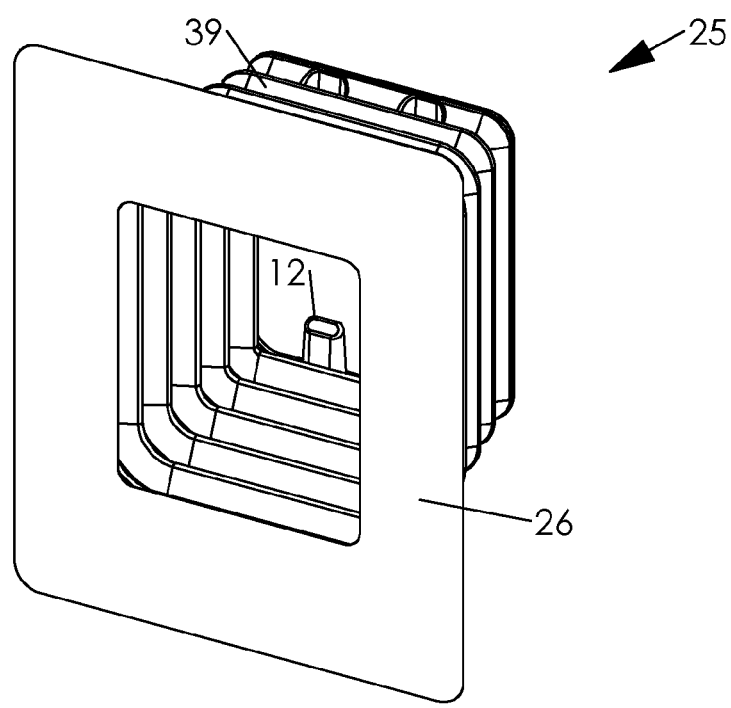
FIG. 16 is a perspective view of another collapsible assembly device suitable for installation during rough-in stage of new construction.

FIG. 15 is a perspective view of a vapor barrier enclosure to be installed on a bracket in a manner similar to that described with respect to FIGS. 14*a-c*. The enclosure 41 is expandable and collapsible in the same manner as earlier described in more detail with respect to FIGS. 13*a* and 13*b*. Wall 39, in its collapsed state, reduces product volume during shipping, storage, merchandising, and later stages prior to installation. The expandability allows for installation on studs of differing depths and accommodates boxes of varying depths. The flexible flange 43 of the assembly is stretched over the bracket front face outside edge as shown in FIG. 14*c*. The accordion surfaces 39, when collapsed, lay substantially flat against each other. Conical form 12 is designed to accept and seal around a wire as shown and described with respect to FIGS. 4*b*-4*j*. FIG. 16 is a perspective view of a vapor barrier enclosure to be installed in a manner similar to that described with respect to FIGS. 5*a-c*. Planar surface 26 is taped to the vapor barrier membrane and fixed to a stud with an electrical box. Enclosure 39 is expandable and collapsible in the same manner as the embodiment shown in FIG. 15 to provide the same described advantages.

Figure 17A:
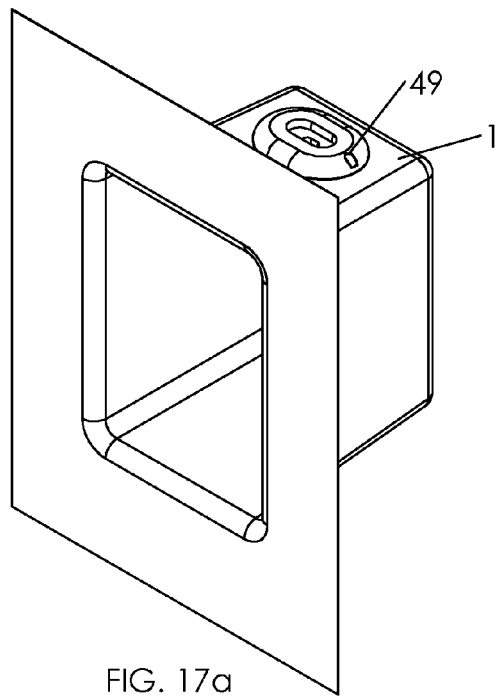
FIG. 17a is a perspective view of another vapor barrier assembly suitable for installation during rough-in stage of new construction including a grommet assembly.
Figure 17B:
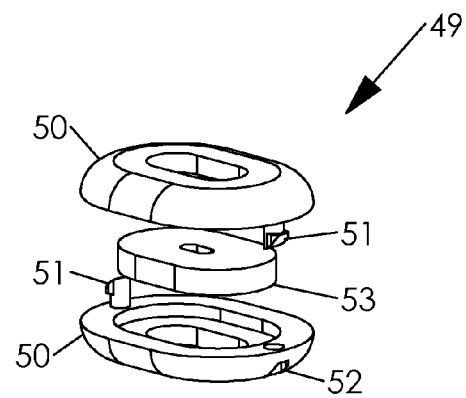

FIGS. 17*a-d* illustrate another vapor barrier assembly that can be used for new construction. The perspective view of FIG. 17*a* illustrates an enclosure 1 having a grommet assembly 49 formed thereon to provide sealed access to an electrical conduit, wire or other penetrating entity. An exploded view of the grommet assembly 49 is shown in FIG. 17*b*. Two identical plastic parts 50 each comprise a barb 51 and female receptacle 52. This configuration permits snapping both parts 50 together with barbs 51 engaging the female receptacles 52 of oppositely facing parts 50 with washer 53 therebetween. Washer 53 may comprise elastomeric material.

Figure 17C:
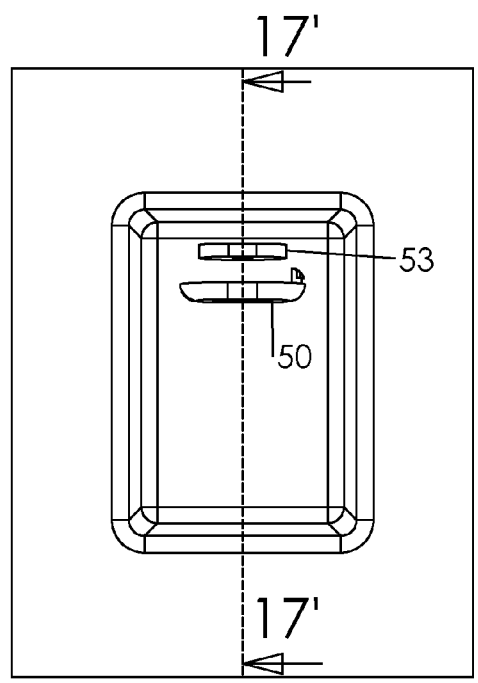
FIG. 17c is a front view of the vapor barrier assembly of FIG. 17a with grommet elements shown in exploded view.
Figure 17D:
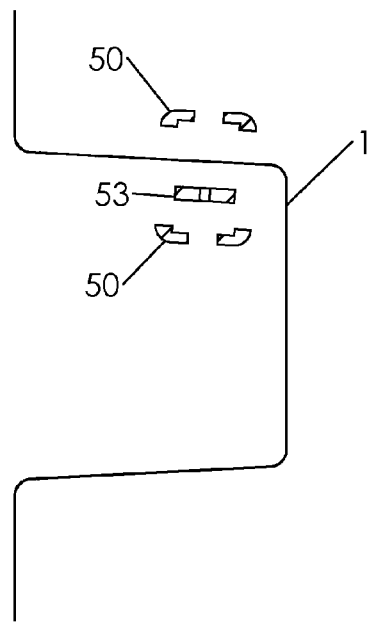
FIG. 17d is a partial section view taken from FIG. 17c.

FIG. 17*c* is a front view of the vapor barrier assembly with the grommet assembly shown exploded. FIG. 17*d* is a partial section view taken at section 17'-17' of FIG. 17*c*. When barbs 51 penetrate the enclosure wall 1 and engage the female receptacles 52 on the other side, the enclosure wall 1 and the washer 53 are sandwiched. The washer 53 inside diameter is smaller than the wire or penetrating entity. After the grommet assembly 49 is installed on the enclosure 1, a screwdriver or relatively sharp tool can be inserted through the inside diameter of the washer to puncture the enclosure wall 1. The penetrating entity can then be inserted. Radial pressure from the resilient washer 53 against the penetrating entity seals the enclosure. Alternatively, the penetrating entity can be inserted through the washer 53 and a punctured hole in the enclosure wall 1 prior to grommet assembly. The grommet assembly 49 can then be assembled by compressing the enclosure wall 1 and the washer 53. The inside diameter of the washer 53 will be decreased to prevent the entity from moving in relation to the enclosure wall. A vapor seal is thereby maintained.

Figure 18A:
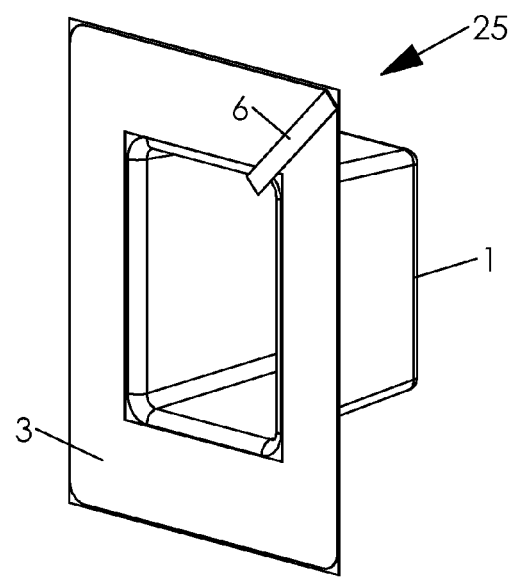
FIG. 18a is a perspective view of a vapor barrier patch to be used for new construction.
Figure 18B:
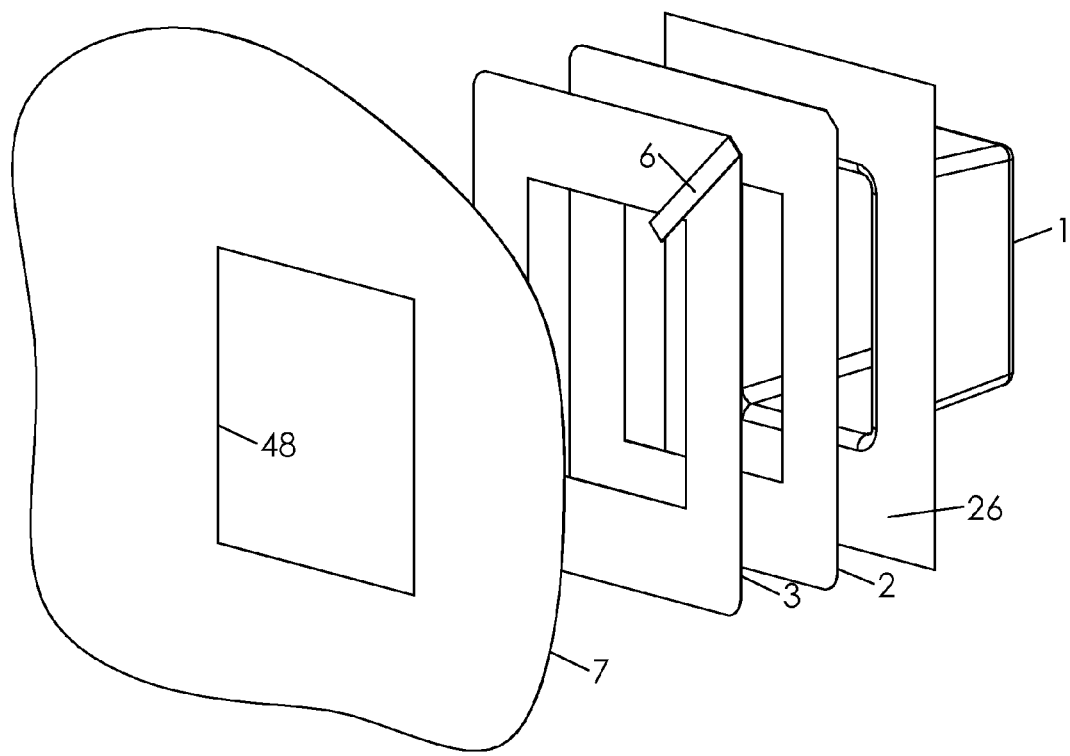

FIGS. 18*a* and 18*b* are perspective and exploded views, respectively, of a vapor barrier assembly for new construction. The assembly has attributes similar to those of FIGS. 5*a* and 14*d*, discussed earlier in more detail. Adhesive 2 is applied to the front face 26 of the enclosure 1 and covered by a protective release liner 3 with pull tab 6. Vapor membrane 7 is applied over the surface of the enclosure and an aperture 48 is cut to allow access to an electrical box (not shown). An installer can then reach through the aperture, grasp the release liner pull tab 6 to expose the adhesive 2 apply pressure to the outside of the membrane in the area of the adhesive 2. The enclosure will then be sealed to the vapor barrier membrane.

Figure 19A:
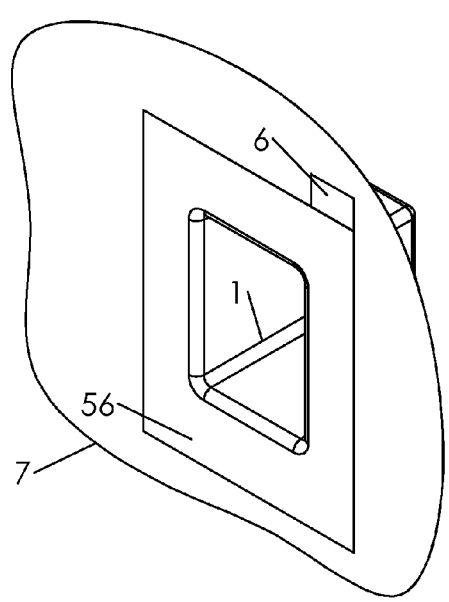
FIG. 19a is a perspective view of another vapor barrier assembly to be used for new construction.
Figure 19B:
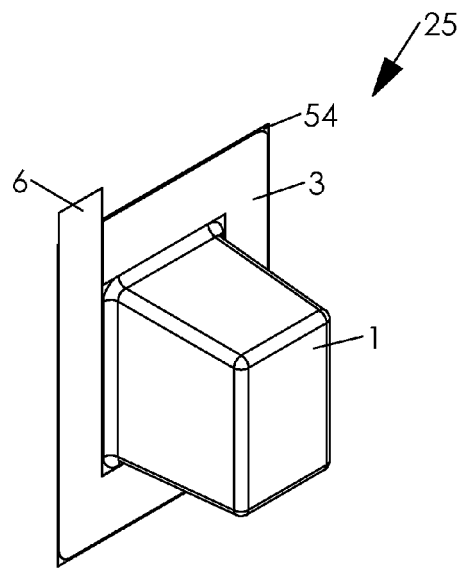
Figure 19C:
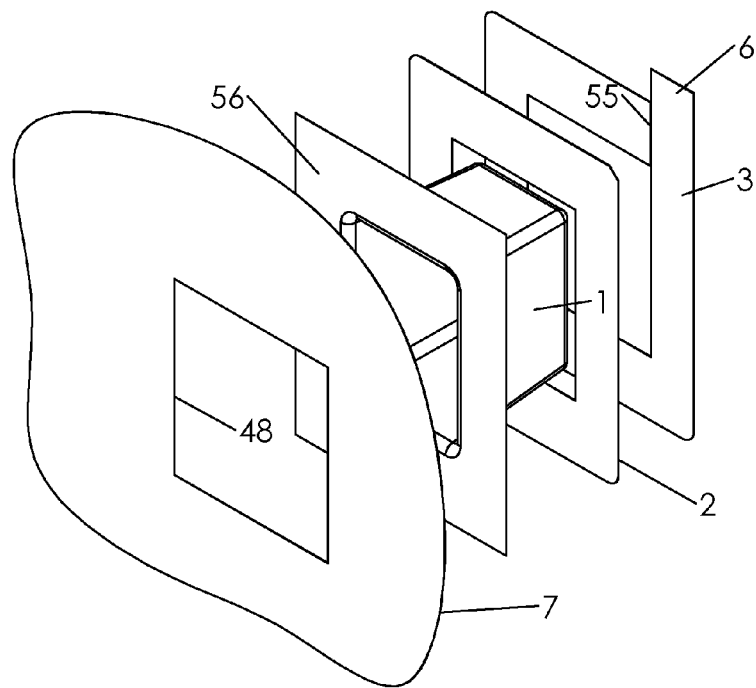
FIG. 19c is an exploded view of the vapor barrier assembly of FIGS. 19a and 19b for installation.

FIGS. 19*a*, 19*b*, and 19*c* are perspective and exploded views of a vapor barrier assembly for new construction. This assembly is a modification of the assembly of FIGS. 18*a* and 18*b*. Adhesive 2 is applied to the back face 54 of the enclosure 1 front flange 56 (FIGS. 19*a*, 19*b*) and covered by protective release liner 3 with pull tab 6. Vapor barrier membrane 7 is applied over the flange 56 and an aperture 48 is cut to allow access to the electrical box. An installer can then reach through the hole, grasp and pull flange 56, with adhesive 2 and release liner 3, through aperture 48 so as to overlap membrane 7. Pull tab 6 can then be grasped to remove the release liner. Pressure can then be applied to flange 56 to bond adhesive 2 to the membrane and create a seal. Slit 55 in the release liner 3 permits removal around the perimeter of the flange 56.

Figure 20A:
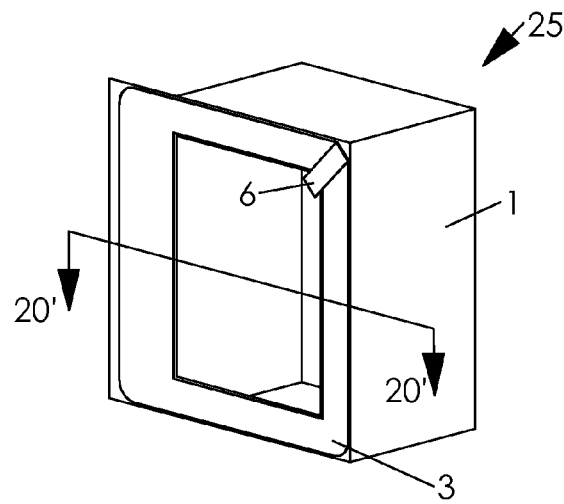
FIG. 20a is a perspective view of an alternative vapor barrier assembly to be used for new construction.
Figure 20B:
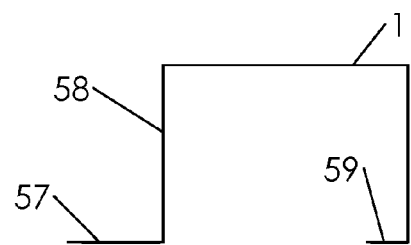
Figure 20C:
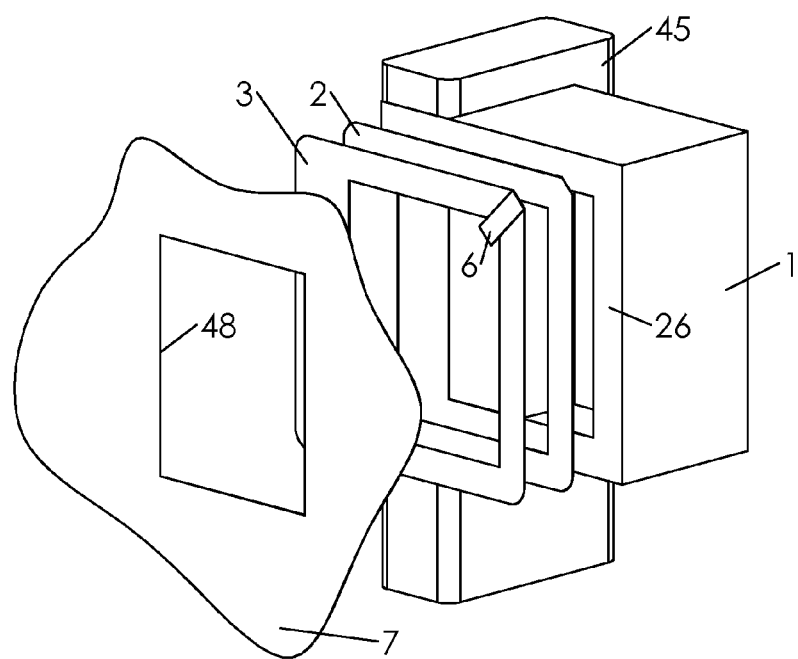
FIG. 20c is an exploded view of the vapor barrier assembly of FIGS. 20a and 20b for installation.

FIGS. 20*a-c* exemplify yet another alternative embodiment of the vapour barrier assembly 25 for new construction. Section 20'-20' is shown in FIG. 22*b*. The illustrated configuration allows positively supported back pressure for effective bonding of the front surface 26 of the enclosure to the membrane 7. As in the previously disclosed embodiments, the enclosure can be made of polyethylene or the like and can be formed by injection molding, blow molding or other plastic forming method. Flanges can be affixed using additive means, such as plastic welding. Adhesive 2 is applied to the front surface of the assembly 26 and covered with release liner 3. Surface 57 and surface 58 lie respectively flush on front and adjacent side of stud 45. An electrical box (not shown) can be inserted in enclosure 1 and can be fixed to the stud 45 in conventional manner while holding the enclosure 25 in position. Membrane 7 is applied over the front of enclosure 25 and aperture 48 is cut in the membrane 7 to provide access to the electrical box, or other device to be installed. Access is provided to pull tab 6 that allows the release liner to be removed to reveal adhesive 2. Where the enclosure flange 26 overlaps the front of stud 45, pressure can be applied directly to the membrane to seal it against the flange 26. On the portion of the surface of flange 26 that is not supported by the stud, a compressive force can be applied to the front of membrane 7, and thus the adhesive 2 and surface 59 on the inside of the enclosure 1. Access to surface 59 allows fingers, or a tool to be inserted to be able to apply counter pressure and ensure that a positive bond is created.

Figure 21A:
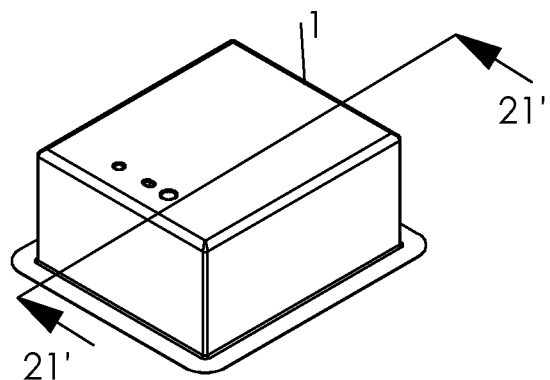
FIG. 21a is a perspective view of vapor barrier enclosure to be mounted between ceiling joists during the rough-in stage of new construction.
Figure 21B:
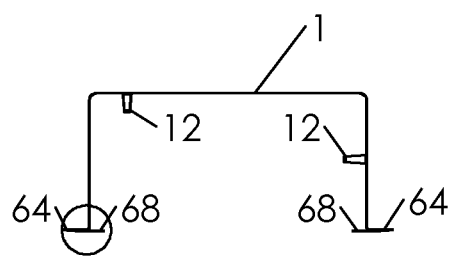
Figure 21C:
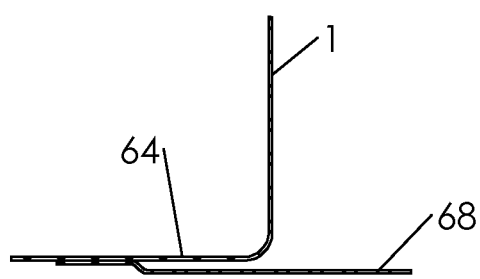
FIG. 21c is a detail view of the portion circled on the section view of FIG. 21b.

FIGS. 21a-c illustrate a vapor barrier enclosure 1 for ceiling recessed light fixture installation in new construction. The enclosure 1 comprises a vacuum formed box with an outwardly projecting perimeter flange 64 surrounding the opening, as seen in the section view of FIG. 21b. An inwardly projecting flange 68 is bonded through an ultrasonic weld or other method to the outer perimeter of flange 64 creating an undercut and a horizontal space between the flanges. This feature is shown in more clearly in the detailed view of FIG. 21c. Conical forms 12, such as earlier described, are molded into the vacuum formed enclosure 1 to serve as access sites facilitating insertion and sealing of penetrating wires.

Figure 22A:
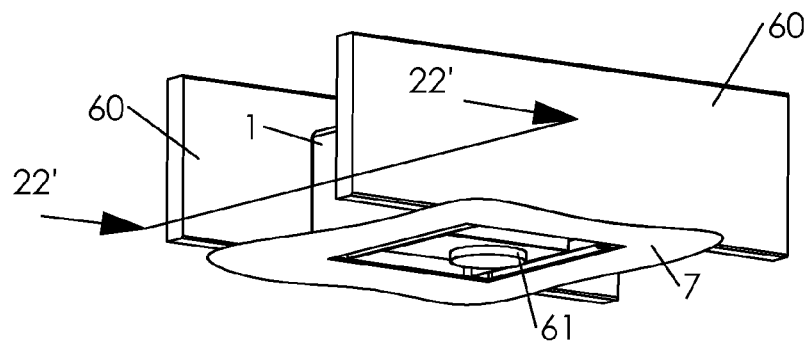
FIG. 22a is a perspective view of a ceiling recessed light fixture electrical device installed within the vapor barrier enclosure shown in FIGS. 21a-c between joists during the rough-in stage of new construction.
Figure 22B:
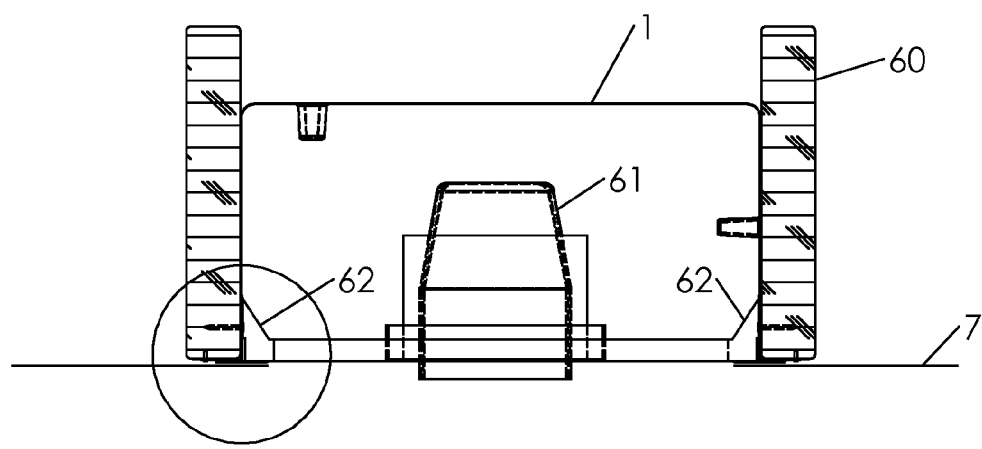
Figure 22C:
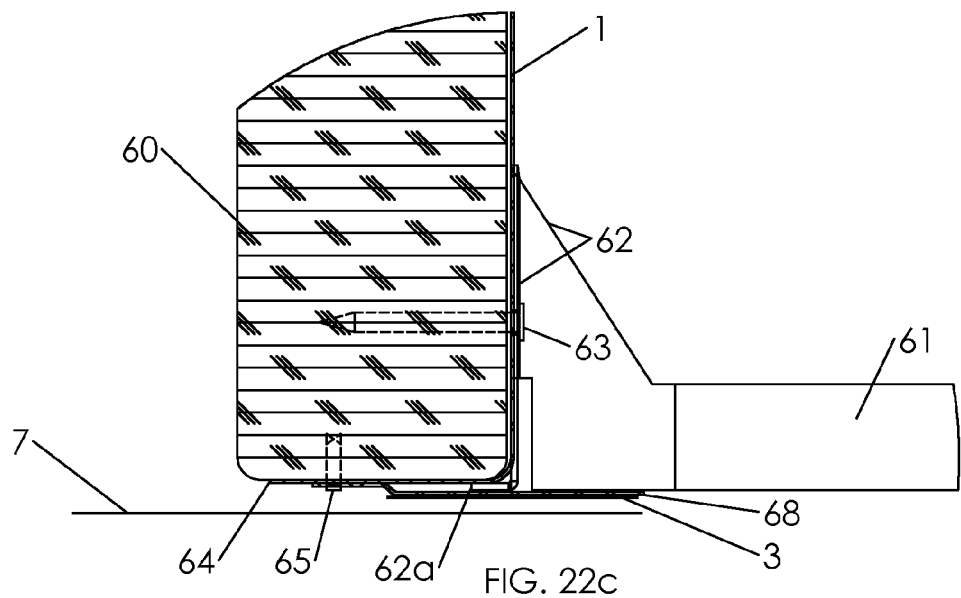
FIG. 22c is a detail view of a portion of the section view of the assembly shown in FIG. 22b.

FIGS. 22a-c illustrate a ceiling recessed light fixture 61 installed with the vapor barrier enclosure shown in FIGS. 21a-c. Vapor barrier enclosure 1 is installed between joists 60 in a ceiling cavity to maintain the integrity of the vapor barrier membrane 7. The vapor barrier enclosure 1 may be held in place initially with staples 65 or the like driven through enclosure perimeter flange 68 into joist 60. The enclosure may be sized, for example, to fit between joists spaced at standard 12" centers and, if rotated 90 degrees, to fit between joists spaced at standard 16" centers. The light fixture 61 can then be inserted in the vapor barrier enclosure 1 cavity. Fixture mounting arms 62 are positioned against the enclosure 1 and joist 60 and held in place with fasteners 63. The horizontal edge flange 62a of the fixture mounting arm 62 is placed in the horizontal space between flanges 64 and 68, as shown more clearly in the detailed view of FIG. 22c. Flange 68 has adhesive and release liner 3 on its underside to permit bonding to the vapor barrier membrane 7. Access to the superior undercut surface of flange 68 by the installer allows a compressive force on flange 68 and membrane 7 to ensure effective bonding between flange and membrane.

Figure 23A:
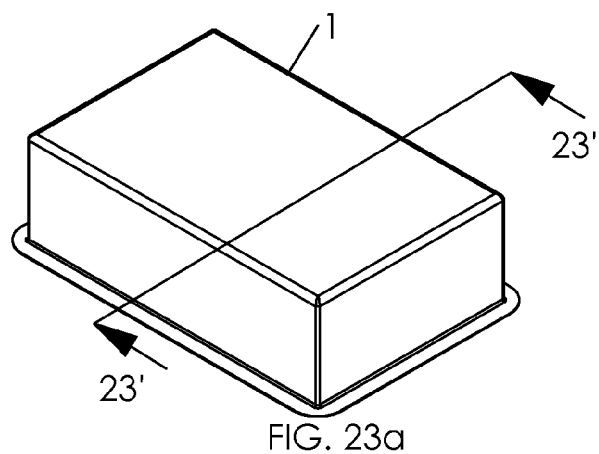
FIG. 23a is a perspective view of vapor barrier enclosure with an integral frame to be mounted between ceiling joists during the rough-in stage of new construction.
Figure 23B:
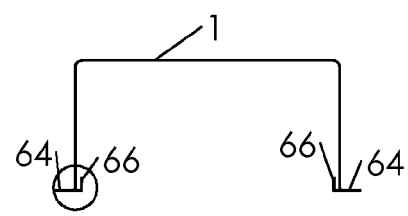
Figure 23C:
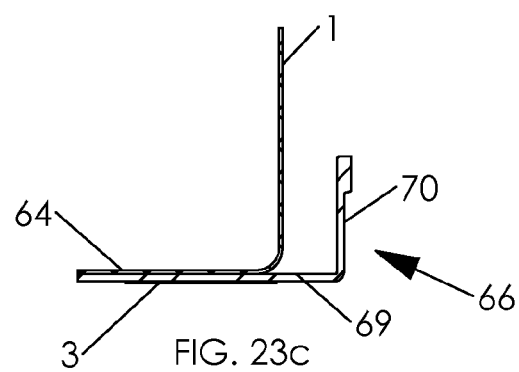
FIG. 23c is the detail view of a portion circled on the section view of FIG. 23b.

FIGS. 23a-c illustrate a vapor barrier enclosure 1 with an integral bracket for mounting a ceiling recessed light fixture in new construction. An outwardly projecting perimeter flange 64 of enclosure 1 surrounds the opening. Bracket 66, which may be injection molded, is bonded to the enclosure 1, as shown most clearly in the detail view of FIG. 23c. Horizontal planar surface 69 of the bracket 66 may be bonded by an ultrasonic weld, or equivalent method, to the outer perimeter of flange 64. An adhesive and release liner 3 is affixed to underside of flange 69 to permit bonding to the vapor barrier membrane. Bracket 66 has a Vertical flange 70 of bracket 66 extends around the inner perimeter of planar surface 69.

Figure 24A:
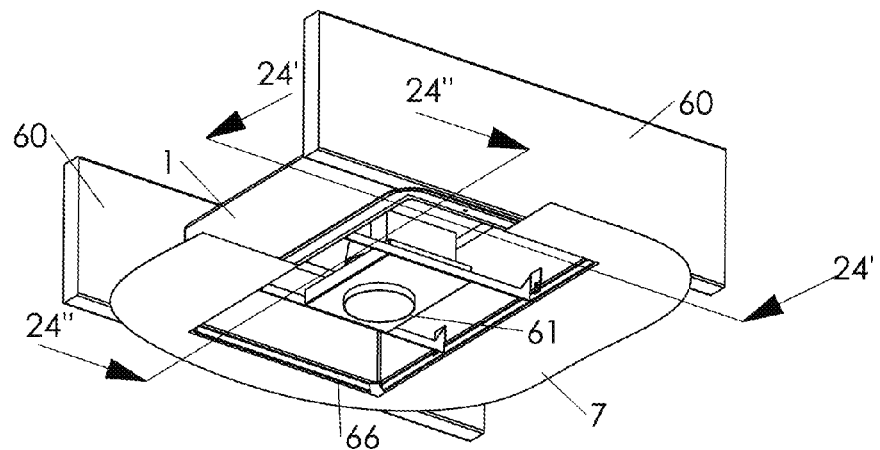
FIG. 24a is a perspective view of a ceiling recessed light fixture electrical device suspended from a bracket integral to the vapor barrier enclosure shown in FIGS. 23a-c, installed between joists during the rough-in stage of new construction.
Figure 24B:
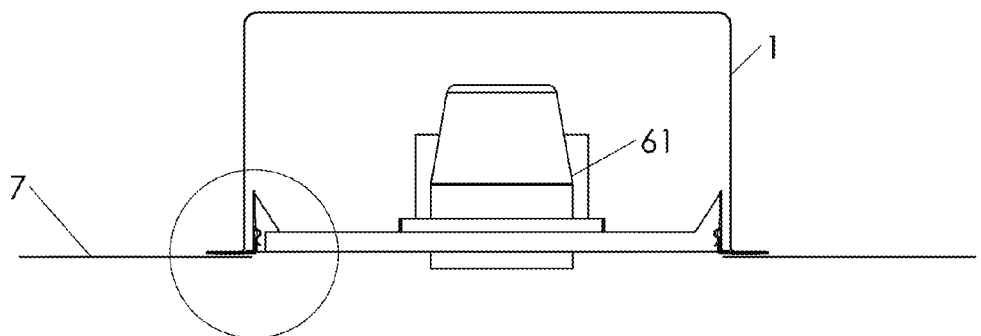
Figure 24C:
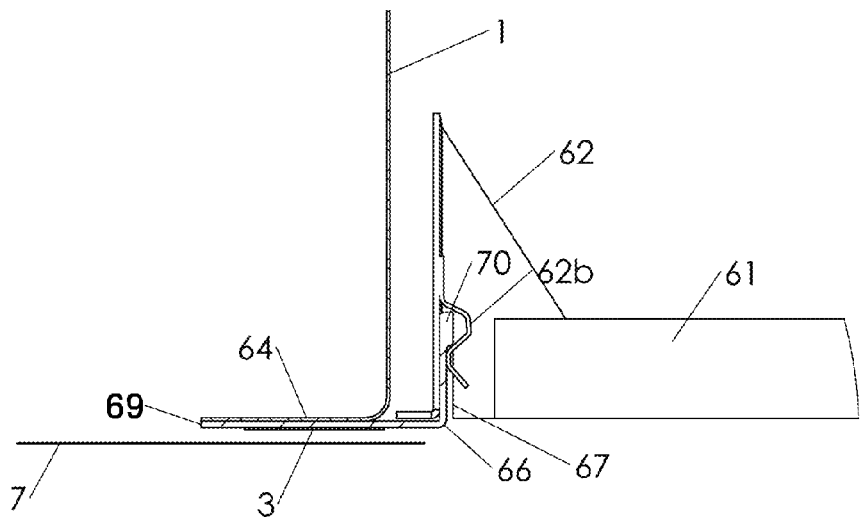
FIG. 24c is a detail view of a portion circled on the section view of FIG. 24b.
Figure 24D:
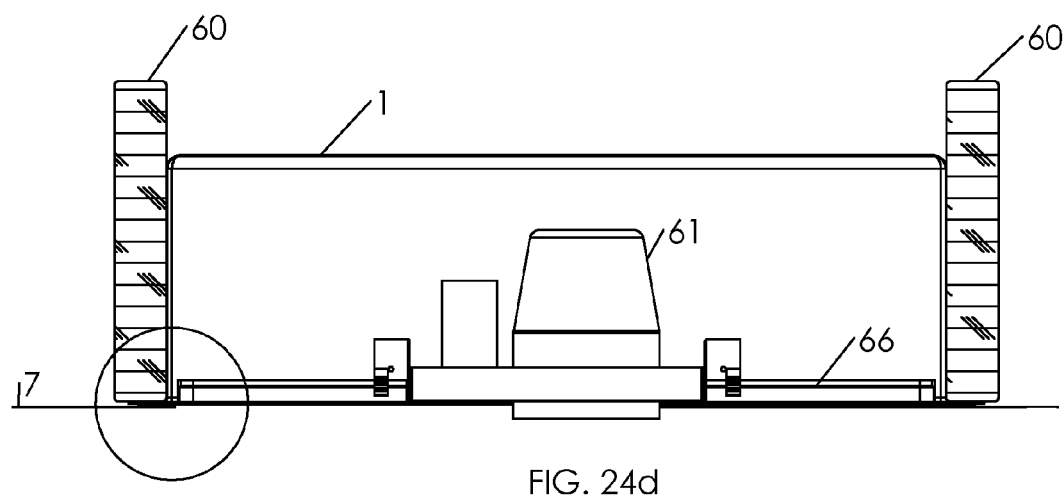
Figure 24E:
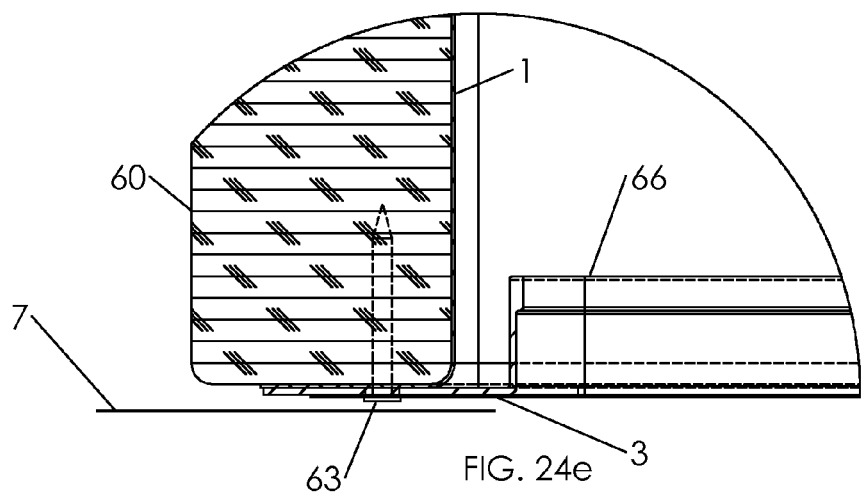
FIG. 24e is a detail view of a portion circled on the section view of FIG. 24d.

FIGS. 24a-e illustrate a ceiling recessed light fixture 61 installed with the vapor barrier enclosure shown in FIGS. 23a-c. Vapor barrier enclosure 1 is installed between joists 60 in a ceiling cavity to maintain the integrity of the vapor barrier membrane 7. The vapor barrier enclosure 1 with integral bracket 66 may be fastened to the underside of joists 60 using fasteners 65 through horizontal surface 69 of the bracket 66, as shown in FIG. 24e. The light fixture 61 may then be supported in the vapor barrier enclosure 1 cavity by hanging fixture mounting arm 62 via slots 67 on vertical flange 70 of bracket 66, as shown in FIG. 24c. Sprung retainer 62b can be hung over the thicker upper portion of flange 70 to retain fixture 61 on the bracket 66. Adhesive and release liner 3 on the underside of flange 69 permits bonding of the flange 69 to the vapor barrier membrane 7. After the vapor barrier membrane is installed, a hole is cut in the membrane to provide access to the fixture 61. The release liner can then be removed so that the installer can push the membrane in the area of now exposed adhesive against the underside of planar surface 69 of bracket 66 to ensure bonding of the membrane 7 to the vapor barrier enclosure 1.

Figure 25A:
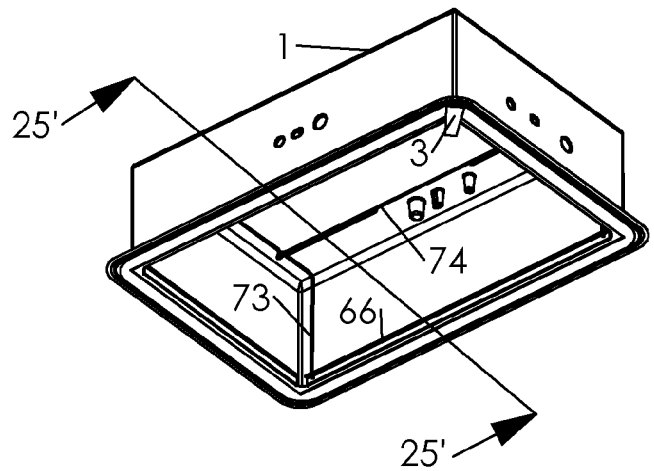
FIG. 25a is a perspective view of an alternate embodiment of the vapor barrier enclosure with integral bracket shown in FIGS. 24a-e.
Figure 25B:
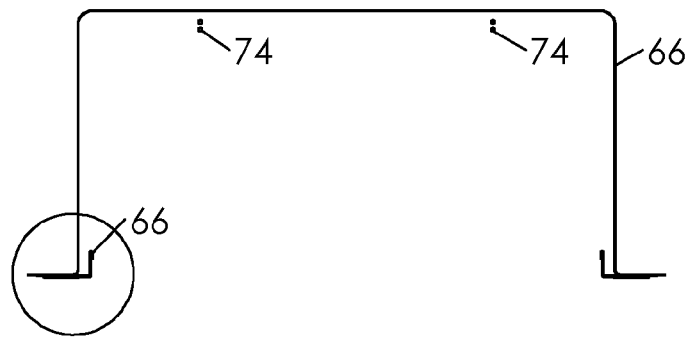
Figure 25C:
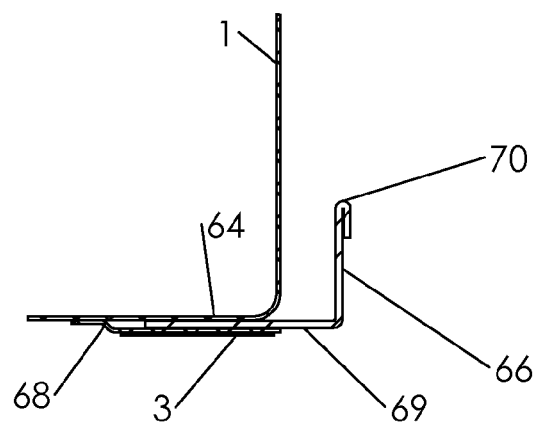
FIG. 25c is a detail view of a portion circled on section view of FIG. 25b.
Figure 26A:
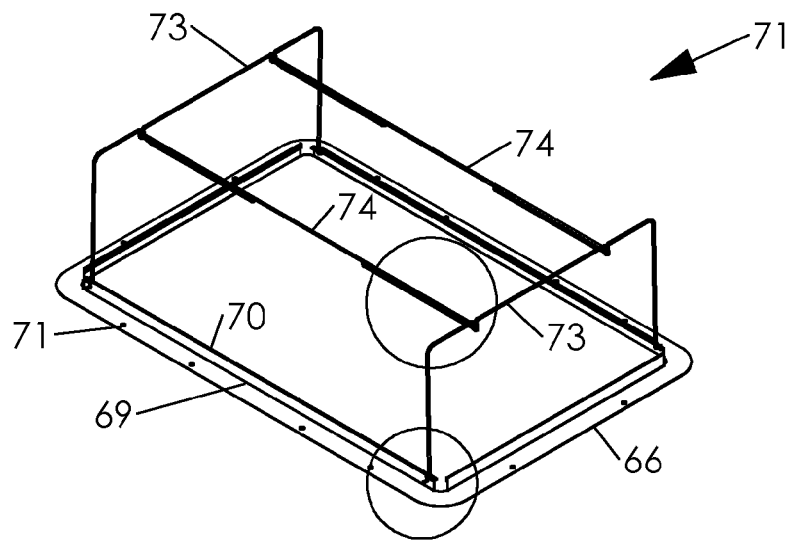
FIG. 26a is a perspective view of a bracket and box support structure shown in FIGS. 25a-c.
Figure 26B:
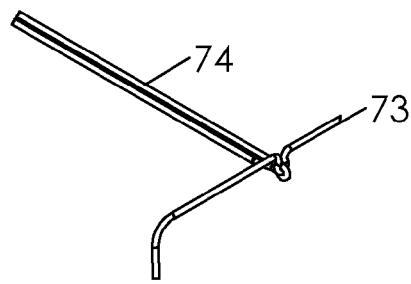
Figure 26C:
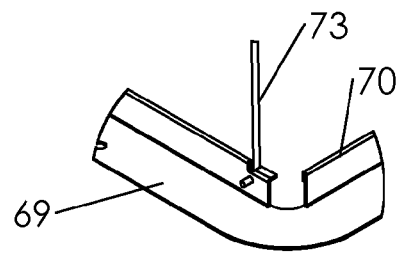
Figure 26D:
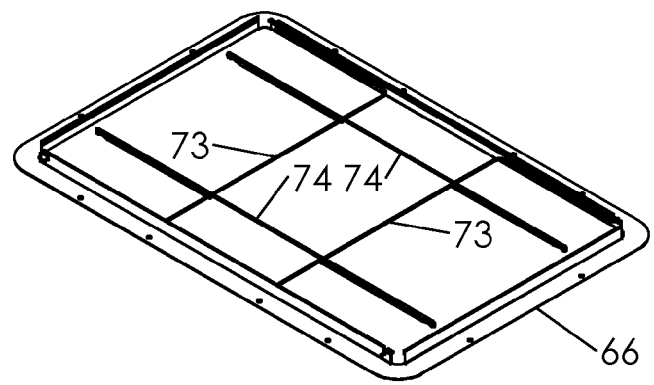
FIG. 26d is a perspective view of the bracket assembly shown in FIG. 26a in collapsed state.

An alternative embodiment is illustrated in FIGS. 25a-c. Bracket 66, formed of steel or equivalent material, is inserted into the enclosure 1 between flanges 64 and 68. A collapsible support structure 71 for enclosure 1 comprises support arms 73 and cross bars 74. The structure reduces the likelihood of collapse of the vapor barrier enclosure 1 under the weight of insulation and limits contact between the enclosure 1 and the ceiling fixture.

Support structure 71 is shown in more detail in FIGS. 26a-d. Bracket 66 comprises a horizontal planar surface 69 with a central aperture, and vertical walls 70 that frame the perimeter of the aperture. To facilitate shipping by reducing the volume of the bracket 66 and superstructure assembly, the superstructure is collapsible. Support arms 73 rotate about holes in the vertical walls 70 of the bracket 66. Support arms 73 are slidable within the openings of the cross bars 74. The support arms 73 are prevented from rotating past a vertical position by detents at the ends of the cross bars that lock into the vertical position to prevent collapse of the enclosure.

Prior to installation, bracket assembly 71 is inserted into the vapor barrier enclosure 1 by stretching flange 68, made of a resilient material, over the outer perimeter of planar surface 69. Flange 68 can be ultrasonically welded to flange 64 of the vacuum formed enclosure 1. Adhesive and release liner 3 formed on the underside of flange 68 permit bonding of the flange to the vapor barrier membrane.

Figure 27A:
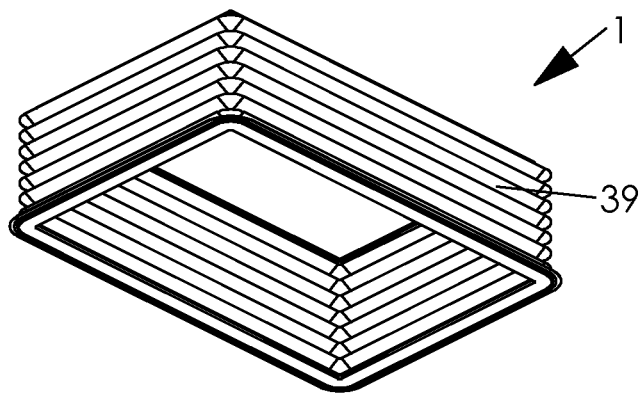
FIG. 27a is a perspective view of an expandable and collapsible vapor barrier enclosure.
Figure 27B:
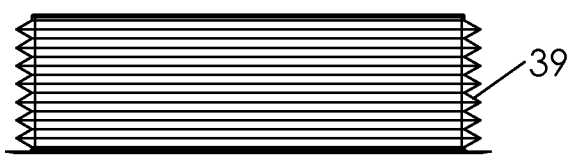
FIG. 27b is a front view of the vapour barrier enclosure shown in FIG. 27a in its expanded state.
Figure 27C:
FIG. 27c is a front view of the vapour barrier enclosure shown in FIG. 27a in its collapsed state.

FIGS. 27a-c illustrate an expandable and collapsible vapor barrier enclosure 1 for use with a ceiling vapor barrier membrane. This embodiment reduces product volume during shipping, storage, merchandising, and later stages prior to installation. The expandability allows for installation on joists of differing depths and accommodates electrical devises of varying depths, as illustrated in FIG. 27b. The accordion surfaces 39 when collapsed, as shown in FIG. 27c, lay substantially flat against each other. This embodiment can function with or without a bracket and/or superstructure.

Figure 28A:
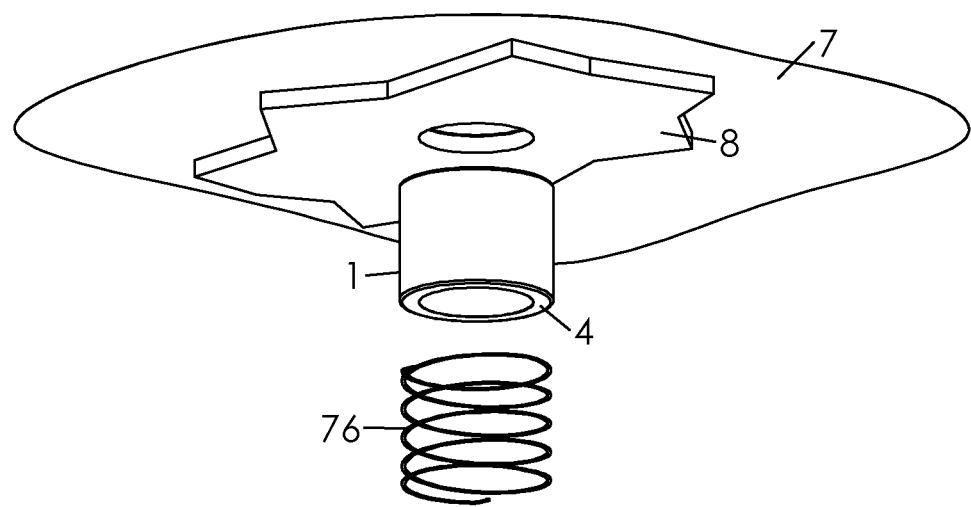
FIG. 28a is an exploded perspective view of another vapor barrier enclosure assembly with a support structure.
Figure 28B:
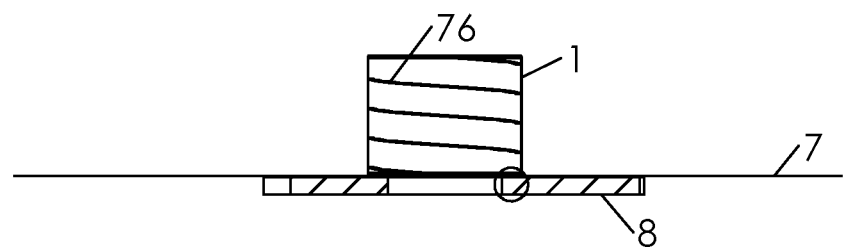
Figure 28C:
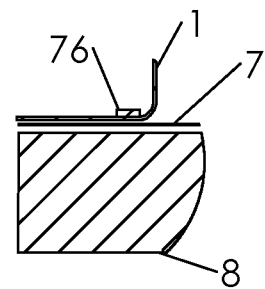
FIG. 28c is a detail view of a portion of the section view of the assembly shown in FIG. 28b.

A vapor barrier enclosure assembly similar to that shown in FIG. 12 for use with a ceiling vapor barrier membrane, is shown in FIGS. 28a-c. The enclosure 1 is applicable to rework construction wherein a hole is cut in the drywall 8 (or ceiling substrate) and the vapor barrier membrane 7. Internal wires can then be fished to the location and into vapor barrier enclosure 1. After insertion of enclosure 1 through the hole, the release liner is removed from the lower planar surface 4 to expose the adhesive. The installer can insert fingers through the hole and apply pressure to the undercut surface to bond the planar surface 4 to the membrane 7.

Helix spring support structure 76m shown in the exploded view of FIG. 28a and the sectional view of FIG. 28b, can be threaded into the hole and enclosure 1. The structure 76 reduces the likelihood of collapse of the vapor barrier enclosure 1 under the weight of insulation and limits the contact of the enclosure 1 with the electrical device.

Figure 29A:
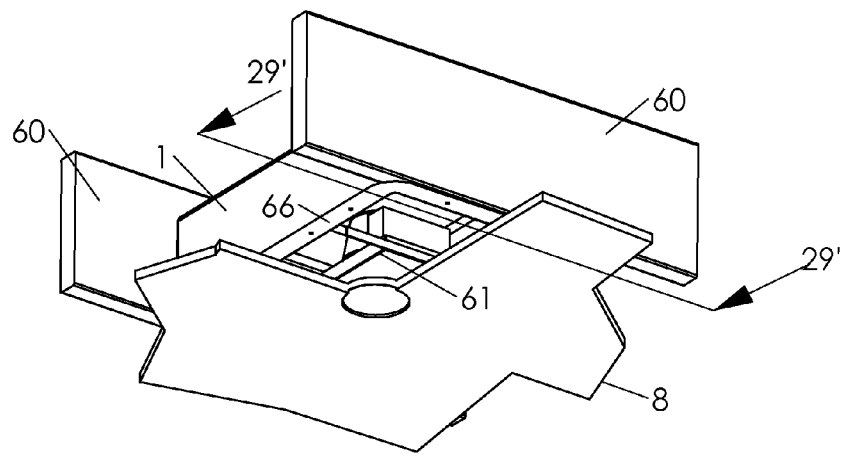
FIG. 29a is a perspective view of a ceiling recessed light fixture electrical device suspended from a bracket integral to a barrier enclosure similar to that shown in FIGS. 24a-c, installed between joists during the rough-in stage of new construction.
Figure 29B:
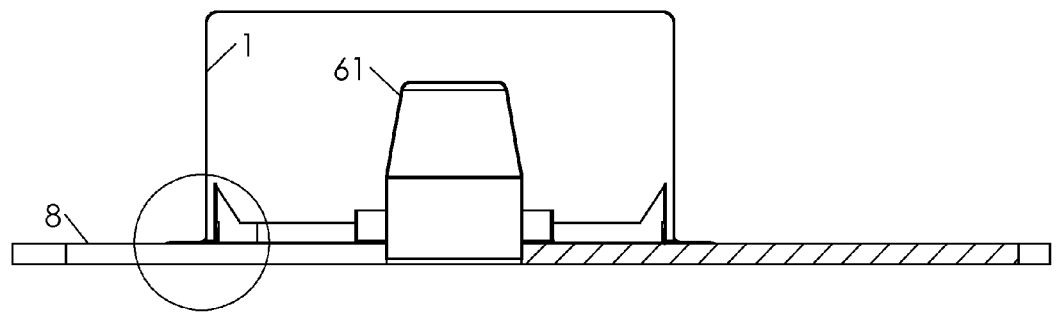
Figure 29C:
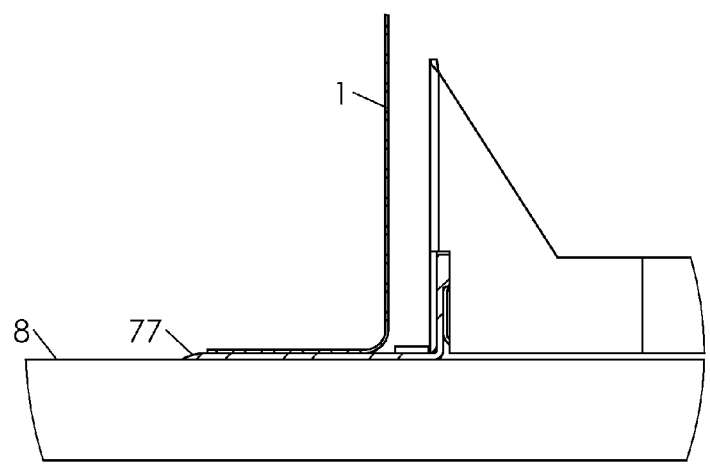
FIG. 29c is a detail view of a portion circled on the section view of FIG. 29b.
Figure 29D:
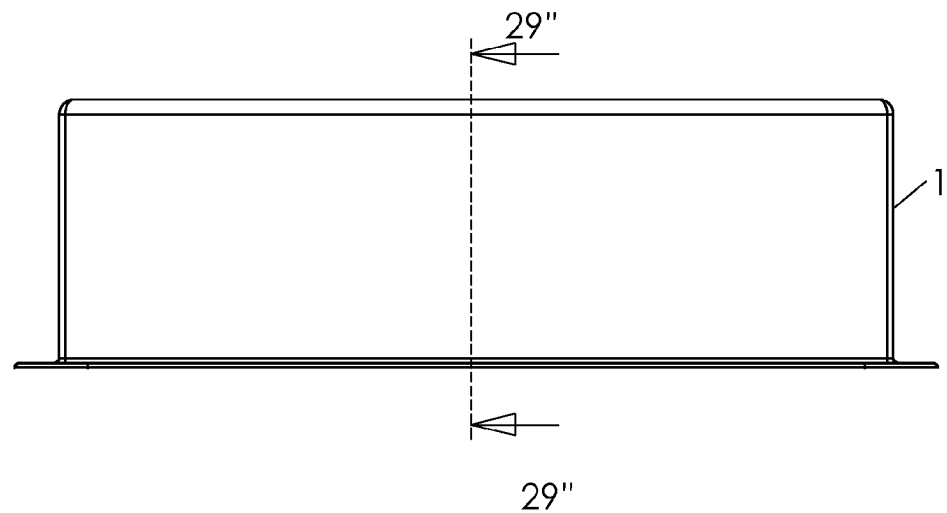
FIG. 29d is a front view of the barrier in the assembly shown in FIGS. 29a-c.
Figure 29E:
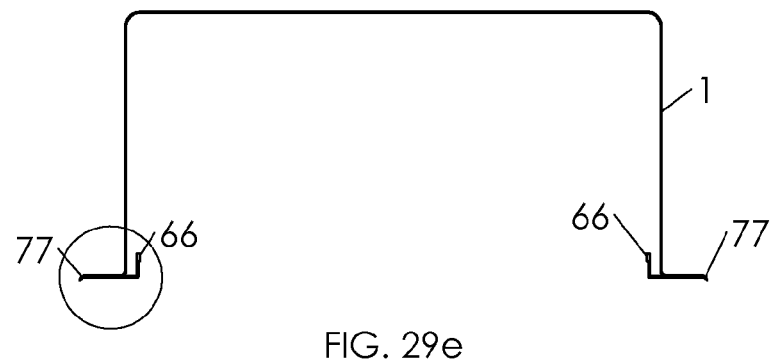
FIG. 29e is a section view taken at 29"-29" in FIG. 29d.
Figure 29F:
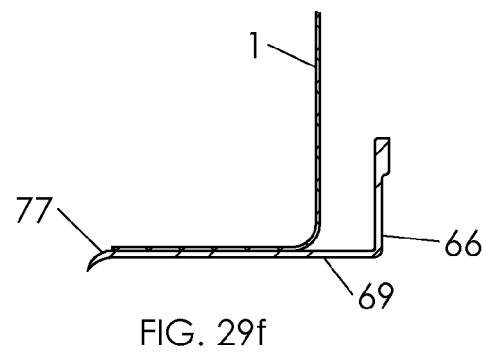
FIG. 29f is a detail view of a portion circled on the section view of FIG. 29e.

FIGS. 29a-c illustrate a ceiling recessed light fixture 61 installed with barrier enclosure 1 and integral bracket 66 shown in FIGS. 29d-f. The barrier enclosure 1 with integral bracket 66 is mounted to the joists 60 in the same manner described above with respect to FIGS. 24a-e. Enclosure 61 is effective as a protection barrier for light fixture, avoiding accumulation of dust or insulation. Enclosure 61 also serves as a sound barrier. In lieu of a vapor barrier membrane, such as illustrated in FIG. 24*a*, drywall sheet 8 is mounted to the underside of the joist 60. This embodiment can be used without a vapor barrier membrane between floors of a building where there would not be exposure to outside air. Enclosure 61 thus serves as a dust barrier protecting the electrical devise housed within. Sound insulation installed between joists is thus prevented from coming into contact with the ceiling device. Enclosure 61 also serves as a sound barrier to reduce the sound transmission in the area of the device if no sound insulation is present. As shown in FIG. 29*c*, wiper 77 is a flexible extension to flange 69, which can be produced by a second injection mold material. Alternatively, wiper 77 can be mounted on bracket 66 or a bead of dried silicon applied to flange 69. FIG. 29*f* shows wiper 77 in its undeformed state prior to installation of the drywall. FIG. 29*c* shows the wiper in its deformed state sealing against the drywall.

In this disclosure there are shown and described only exemplary concepts and but a few examples of versatility. It is to be understood that the various other combinations and environments are within contemplation of the concepts expressed herein. For example, the enclosure is applicable for use with a variety of ceiling mounted devices, such as light fixtures, speakers and fans. The enclosure 1 can be useful without a vapor barrier membrane to protect the electrical device from dust produced in the ceiling cavity or to limit noise transmission.

What is claimed is:

1. A device for an opening in a vapor barrier membrane interior to a ceiling of a building structure, the device comprising:
    a flexible enclosure configured to seal an opening in the vapor barrier membrane, wherein the enclosure comprises:
    an integrally walled cavity configured to encompass a ceiling mounted electrical device, and
    a planar member having an aperture in a planar surface thereof sized to surround the membrane opening, the planar member projecting outwardly from the walled cavity;
    a flange fixed substantially parallel to the planar member and extending in an inward direction from the planar member's outer perimeter; and
    a fastener joined to an outer surface of the flange for bonding with an interior surface of the membrane.

2. A device for an opening in a vapor barrier membrane interior to a ceiling of a building structure, the device comprising:
    a flexible enclosure configured to seal an opening in the vapor barrier membrane, wherein the enclosure comprises:
    an integrally walled cavity configured to encompass a ceiling mounted electrical device, and
    a planar member having an aperture in a planar surface thereof sized to surround the membrane opening, the planar member projecting outwardly from the walled cavity;
    a flange fixed to the planar member and extending in an inward direction from the planar member; and
    a fastener joined to a surface of the flange for bonding with an interior surface of the membrane;
    wherein the flange comprises a portion spaced from and parallel to the planar member to form a channel configured to engage an electrical device mounting structure.

3. A device as recited in claim 2, wherein the fastener comprises a removable release liner covering an adhesive.

4. A device as recited in claim 2, wherein the enclosure comprises at least one access site for introducing an electrical wire from outside the enclosure to the electrical device within the cavity.

5. A device as recited in claim 2, wherein the planar member comprises an extending portion configured for attachment to a ceiling joist.

6. A device as recited in claim 5, wherein the wall cavity is generally rectangular in cross-section, the enclosure configured to fit between adjoining ceiling joists.

7. A device as recited in claim 6, wherein a first side of the rectangular enclosure corresponds to a first standard joist spacing and a second side of the rectangular enclosure corresponds to a second standard joist spacing.

8. A device as recited in claim 2, wherein the flange extends beyond an inner perimeter of the planar member.

9. A device as recited in claim 8, further comprising a bracket in engaging relationship with the flange portion, the bracket configured to support electrical device mounting structure.

10. A device as recited in claim 9, further comprising a retainer coupled to the bracket for retaining the electrical device mounting structure to the flange portion.

11. A device as recited in claim 10, wherein the fastener comprises a removable release liner covering an adhesive.

12. A device as recited in claim 2, further comprising:
    a bracket in engaging relationship with the flange portion within an inner perimeter of the planar member, the bracket comprising a portion generally orthogonal to the planar member; and
    a collapsible superstructure coupled to the orthogonal portion of the bracket; wherein the superstructure is configured to support the enclosure.

13. A device as recited in claim 12, the collapsible superstructure comprises:
    a plurality of u-shaped support arms having ends thereof rotationally connectable with the orthogonal portion of the bracket; and
    at least one cross bar having ends configured to engage respective support arms.

14. A device as recited in claim 13, wherein the support arms comprise grooved portions configured to receive the cross bar.

15. A device as recited in claim 14, wherein the cross bar ends comprise detent portions configured to limit rotation of the support arms for locking the support arms to positions generally orthogonal to the membrane opening.

16. A device as recited in claim 12, wherein the fastener comprises a removable release liner covering an adhesive.

17. A device as recited in claim 12, wherein the enclosure comprises at least one access site for introducing an electrical wire from outside the enclosure to the electrical device within the cavity.

18. A device as recited in claim 12, wherein the planar member comprises an extending portion configured for attachment to a ceiling joist.

* * * * *